(12) United States Patent
Haramaty et al.

(10) Patent No.: US 11,682,170 B2
(45) Date of Patent: *Jun. 20, 2023

(54) GENERATING THREE-DIMENSIONAL GEO-REGISTERED MAPS FROM IMAGE DATA

(71) Applicant: PTAS I LLC, Wilmington, DE (US)

(72) Inventors: Tom Haramaty, Tel Aviv (IL); Alon Salhov, Tel Aviv (IL); Sid Sampangi, Millbrae, CA (US); Ethan Van Andel, Berkeley, CA (US)

(73) Assignee: PTAS I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,780

(22) Filed: Oct. 12, 2021

(65) Prior Publication Data

US 2022/0108522 A1    Apr. 7, 2022

Related U.S. Application Data

(63) Continuation of application No. 16/124,962, filed on Sep. 7, 2018, now Pat. No. 11,182,954.

(51) Int. Cl.
*G06T 17/05* (2011.01)
*G06T 15/08* (2011.01)

(52) U.S. Cl.
CPC .............. *G06T 17/05* (2013.01); *G06T 15/08* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 8,692,827 B1 | 4/2014 | Guskov et al. | |
| 9,754,413 B1 | 9/2017 | Gray | |
| 10,186,049 B1 | 1/2019 | Boardman et al. | |
| 10,255,716 B1 | 4/2019 | Godzaridis et al. | |
| 11,182,954 B2 * | 11/2021 | Haramaty | G06T 17/05 |
| 2004/0001620 A1 | 1/2004 | Moore et al. | |
| 2006/0228019 A1 | 10/2006 | Rahmes et al. | |
| 2008/0033641 A1 | 2/2008 | Medalia | |
| 2011/0102580 A1 | 5/2011 | Langdon | |
| 2011/0202510 A1 | 8/2011 | Salemann | |
| 2014/0210947 A1 | 7/2014 | Finn et al. | |
| 2014/0300885 A1 | 10/2014 | Debrunner et al. | |
| 2014/0320485 A1 | 10/2014 | Neophytou et al. | |
| 2014/0354626 A1 | 12/2014 | Guskov et al. | |

(Continued)

*Primary Examiner* — Sultana M Zalalee
(74) *Attorney, Agent, or Firm* — Faegre Drinker Biddle & Reath LLP

(57) ABSTRACT

A plurality of images is obtained, whether as separate images or part of a video. The plurality of images is used to generate a three-dimensional (3D) model of the imagery. The 3D model is registered to a geographic coordinate system as a first registered 3D model. The first registered 3D model is merged with a second registered 3D model to generate a merged 3D model. A request including a value corresponding to a location within the geographic coordinate system that includes at least a portion of the merged 3D model is received from a client device. A message identifying at least a subset of points in the portion of the merged 3D model is sent to the client device, each point in the subset having a three-dimensional coordinate.

21 Claims, 19 Drawing Sheets

(56) References Cited

U.S. PATENT DOCUMENTS

| | | |
|---|---|---|
| 2014/0362174 A1 | 12/2014 | Fan et al. |
| 2015/0347872 A1 | 12/2015 | Taylor et al. |
| 2015/0363967 A1 | 12/2015 | Wells et al. |
| 2016/0055268 A1 | 2/2016 | Bell et al. |
| 2016/0379405 A1 | 12/2016 | Baca et al. |
| 2017/0039765 A1 | 2/2017 | Zhou et al. |
| 2017/0053445 A1 | 2/2017 | Chen et al. |
| 2017/0084037 A1 | 3/2017 | Hernandez et al. |
| 2017/0169605 A1 | 6/2017 | Salomonsson et al. |
| 2017/0296845 A1 | 10/2017 | Tallhamer et al. |
| 2017/0301133 A1 | 10/2017 | Min et al. |
| 2017/0330375 A1* | 11/2017 | Chen .................. G06T 7/75 |
| 2018/0075649 A1 | 3/2018 | Godwin et al. |
| 2018/0122080 A1 | 5/2018 | Zaitsev et al. |
| 2018/0218214 A1 | 8/2018 | Pestun et al. |
| 2018/0330149 A1 | 11/2018 | Uhlenbrock et al. |
| 2018/0365891 A1 | 12/2018 | Kuang et al. |
| 2019/0130641 A1 | 5/2019 | Hernandez et al. |

\* cited by examiner

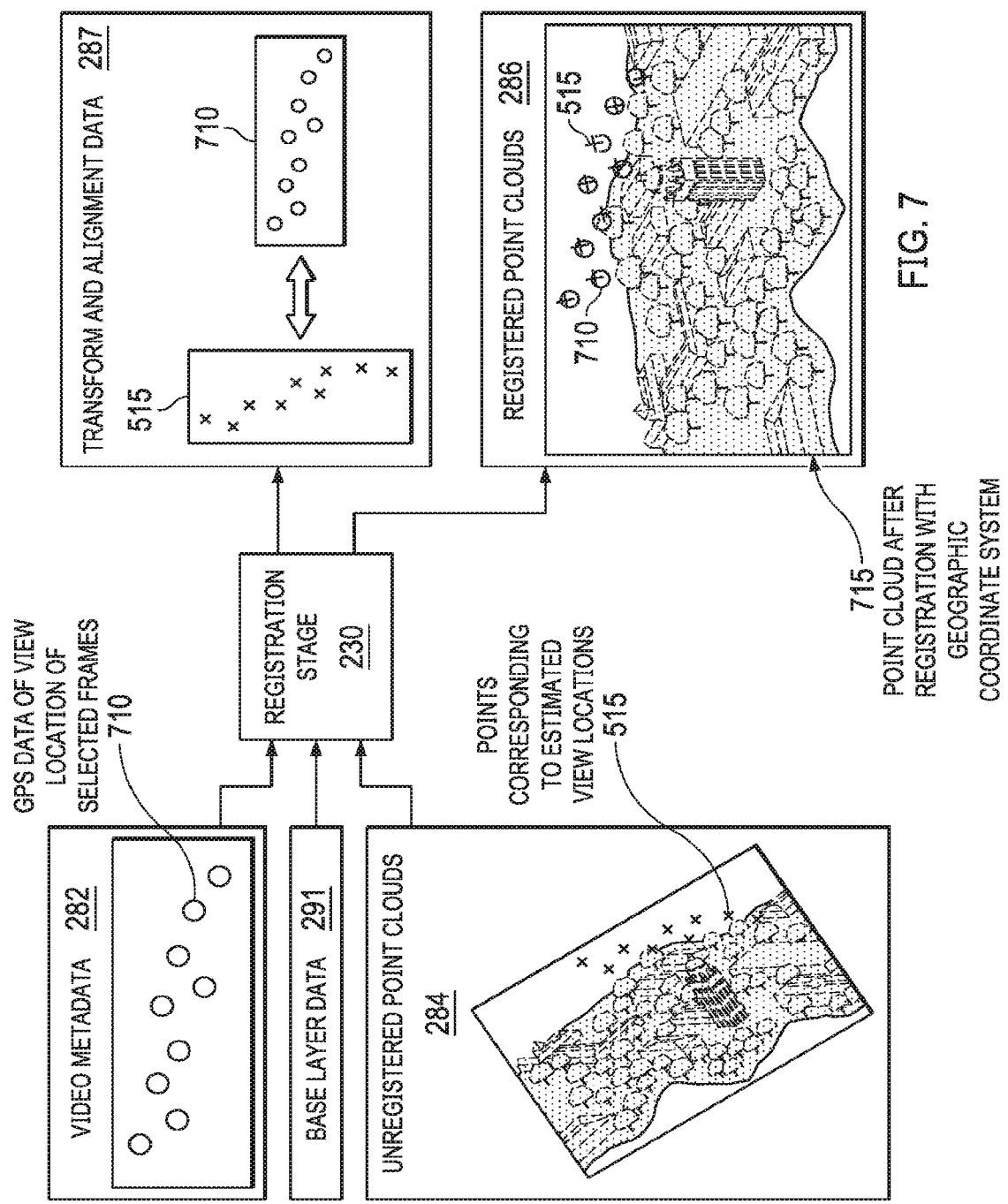

GENERATING THREE-DIMENSIONAL GEO-REGISTERED MAPS FROM IMAGE DATA

This application is a continuation of U.S. patent application Ser. No. 16/124,962, filed Sep. 7, 2018, incorporated by reference herein for all purposes.

Embodiments of the present disclosure relate to the field of mapping; and, more specifically, to generating three-dimensional geo-registered maps from image data.

BACKGROUND ART

Existing approaches to mapmaking often involve aerial imagery or on-the-ground, survey-based techniques. Such approaches, however, are not without their shortcomings, including logistical and technical challenges that limit the creation of large-scale, up-to-date, highly-detailed three-dimensional maps.

SUMMARY OF THE INVENTION

The present disclosure relates to a mapping system, various aspects of which enable the creation of large-scale, up-to-date, highly-detailed three-dimensional maps. Detailed three-dimensional models are generated from video or image data. The models are accurately registered within a geographic coordinate system. Optimal portions of overlapping models are merged, and non-overlapping portions of models are stitched together to form a scalable, detailed, and easily updated three-dimensional map. As a result, the disclosed aspects of the mapping system eliminate many of the logistical and technical challenges associated with existing approaches to mapmaking.

BRIEF DESCRIPTION OF THE DRAWINGS

Various embodiments in accordance with the present disclosure will be described with reference to the following figures.

FIG. 7 illustrates a registration stage of a mapping system and associated I/O, according to some embodiments.

DETAILED DESCRIPTION

Figure 1:
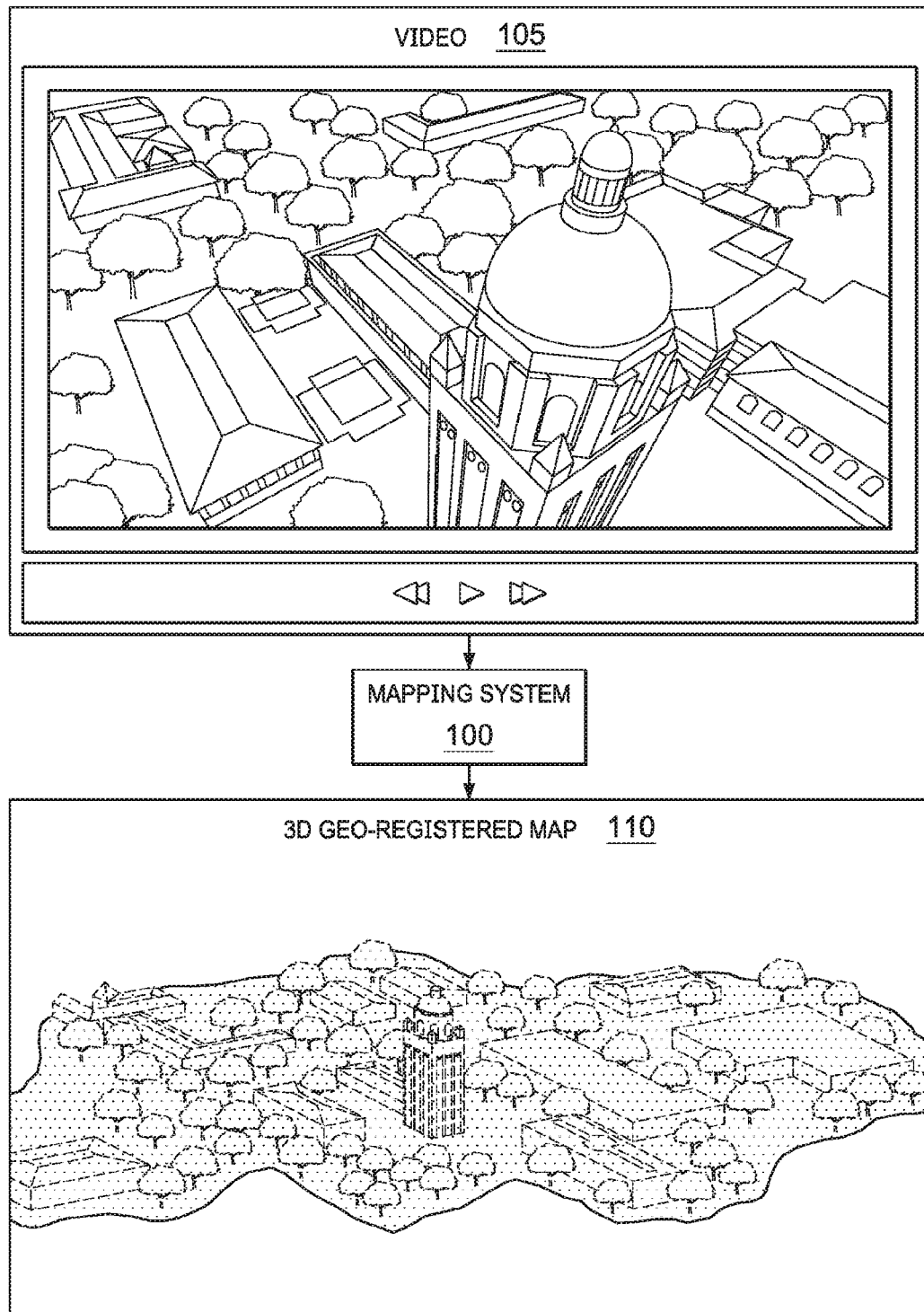
FIG. 1 illustrates a mapping system configured to implement one or more aspects of the present disclosure.

Various embodiments of methods, apparatuses, systems, and non-transitory computer-readable storage media for various aspects of generating three-dimensional geo-registered maps and associated features from image data are described herein.

Existing approaches to mapmaking are not without shortcomings. Such approaches often entail either high- or low-altitude aerial-imagery or on-the-ground surveyance. High-altitude approaches, such as those based on satellite imagery or high-altitude aerial photography, can generate detailed two-dimensional maps covering large portions of the earth's surface and can capture large-scale features such as coastlines, rivers, highways, and cities. But the high-altitude viewpoint of the imaging system fails to provide adequate data to resolve small-scale three-dimensional topographic or terrain features such as the height of buildings, vehicles, and vegetation. Low-altitude imagery can be used to generate improved three-dimensional maps, but generating three-dimensional maps covering large areas is often limited by logistical challenges. For example, low-altitude approaches require an increased number of flights relative to high-altitude approaches to capture the same geographic area. And low-altitude imagery providers often operate in a competitive environment, limiting their incentives to coordinate large-scale mapping efforts. In contrast to aerial approaches, ground-based surveys can provide a very high degree of precision but a very narrow scope, so covering large areas is even more challenging than aerial approaches. Furthermore, these existing approaches, whether aerial or ground-based, often require precisely calibrated, expensive equipment and/or specially trained operators, further limiting the ability to create and maintain detailed three-dimensional maps. As a result, detailed three-dimensional maps are often years (or more) out of date.

Aspects of the present disclosure address the above and other challenges associated with the creation and maintenance of detailed three-dimensional maps. These aspects include the generation of three-dimensional models from a variety of unaffiliated data sources. Imagery from high- or low-cost aerial platforms can be ingested by the mapping system to generate three-dimensional models of the imaged region. The three-dimensional models are accurately registered to a geographic coordinate system. Through a process of stitching together the three-dimensional models from the different data sources and selecting high quality portions of overlapping models, the disclosed mapping system generates a high quality and easily maintainable three-dimensional map. The resulting maps capture a high level of detail of the imaged terrain features, including roads, buildings, vehicles, land topography, vegetation, etc. Further, the ease of capturing and integrating new data into the map results in an aggregation of detailed models over time at a higher frequency than traditional mapping techniques. As a result, the mapping system can perform comparisons of models to highlight detailed terrain changes over relatively short periods of time. Additionally, the mapping system can link regions of the three-dimensional map to the original source data to enable users to easily retrieve original imagery of a region of interest. Aspects of the present disclosure providing these and other advantages are illustrated in the accompanying figures and described below.

System Overview

FIG. 1 illustrates a mapping system configured to implement one or more aspects of the present disclosure. As shown, the mapping system 100 receives video data 105 and, as described herein, processes the data to generate a three-dimensional geo-registered map 110. As used herein, the term geo-registered means attributable to a location in a geographic coordinate system. One exemplary coordinate system is the latitude, longitude, and elevation system used to represent points on earth. Such a system may define elevation based on a reference surface such as the reference surface defined by the World Geodetic System (WGS) 84 standard. Another exemplary coordinate system is the earth-centered, earth-fixed (ECEF) system, which represents points on the surface of earth using a cartesian coordinate system. Other coordinate systems may be used, such as those based on spherical or ellipsoidal geometries that can be mapped to earth. One such system is the S2 geometry, which subdivides the earth (approximated as a unit sphere) into a hierarchy of cells. Cells are identified by a cell identifier, which embeds information related to the cell's position on the sphere, in the hierarchy, and relative to its parent and children cells (if any). Like latitude and longitude, the cells in the S2 geometry represents positions on the surface of the earth, so an altitude or elevation dimension may be added for a full three-dimensional coordinate system, again relative to a reference surface such as that defined in WGS 84.

Although illustrated as receiving video data 105, the mapping system 100 can receive a set of images in some embodiments. Thus, the use of the term "video" herein is intended as descriptive and not limiting, and subsequent references to video and frames or images of a video are equally applicable to still images. Regardless of whether the received data is video or images, as the mapping system 100 receives additional video or image data, the mapping system 100 continues to expand and refine the three-dimensional map 110, as described below. The various aspects of the mapping system 100 described below enable the three-dimensional map 110 to be based on an aggregation of data from a variety of uncoordinated sources, such as low-altitude aerial photography performed using low-cost equipment, such as consumer aircraft equipped with cameras (e.g., drones).

Figure 2:
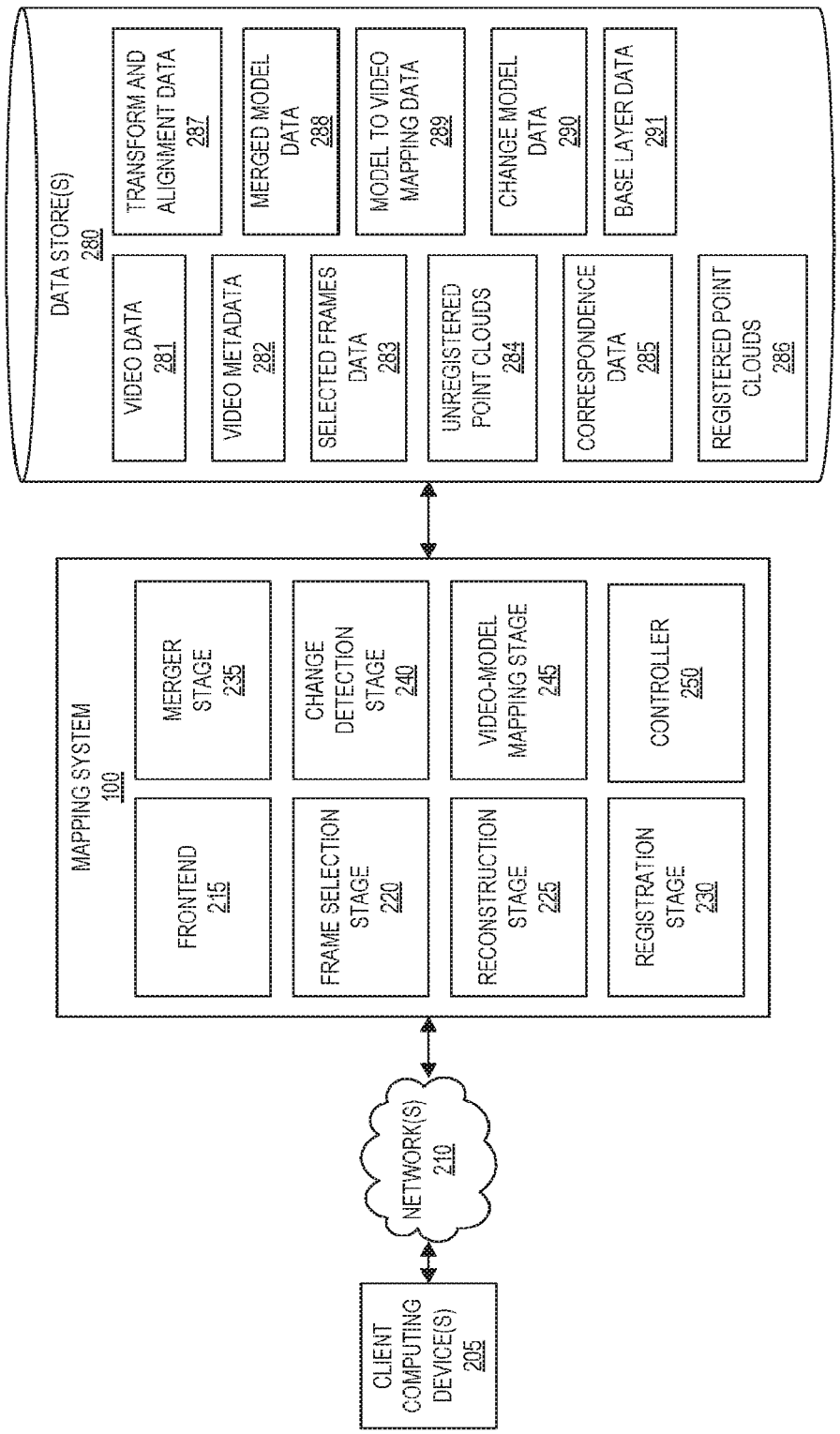
FIG. 2 illustrates a more detailed mapping system, according to some embodiments.

FIG. 2 illustrates a more detailed mapping system, according to some embodiments. As shown, one or more client computing devices 205 are in communication with the mapping system 100 via one or more networks 210. Client computing devices 295 send video or image data to the mapping system 100, and the mapping system 100 sends, inter alia, three-dimensional map data to client computing devices 295. Exemplary client computing devices 205 include smartphones, laptops, desktop computers, hosted-computer systems, network-connected aerial imagery platforms, etc.

In an exemplary usage scenario, a user with an aerial platform such as a consumer drone can record aerial image or video data of an area to be mapped (or to have the map updated). The drone also records metadata associated with the image or video data. Some videos or images may have metadata embedded within the video or image files (e.g., as header information) or have an associated file that contains the metadata. In some embodiments, the metadata includes one or more timestamps that indicate when the image or video data was recorded and global positioning system (GPS) information of individual images or frames that indicates the position of the camera when the data was captured. The user uploads the imagery data and associated metadata to a client computing device 295, which in turn sends the data to the mapping system 100.

In some embodiments, the mapping system 100 includes a frontend 215. The frontend 215 facilitates communications between the client computing devices 205 and the mapping system 100. The frontend 215 may provide one or more application programming interfaces (APIs) or services to allow users to interact with the mapping system 100. For example, the frontend 215 may include a web server to allow client computing devices 205 to communicate with the mapping system 100 over a network 210 such as the internet using a protocol such as the Hypertext Transfer Protocol (HTTP). For example, the web server may provide an interface via which the user can upload videos and associated metadata. Upon receiving the data, the frontend 215 can store the data in a video data store 281 and a video metadata data store 282. In some embodiments, the frontend 215 assigns the unique identifier to each video upon receipt that can be used to identify the video and associated three-dimensional models, among other information.

In some embodiments, components of the mapping system 100 offer one or more internal APIs (not shown) to facilitate messaging between the components. For example, upon receiving a video from a client computing device 205, the frontend 215 may issue an API call to the frame selection stage 220 to initiate or enqueue the newly uploaded data for processing. Likewise, as each stage completes processing, it may issue an API call to another stage in the mapping system 100 to initiate or enqueue subsequent processing operations.

The mapping system 100 also includes a frame selection stage 220, a reconstruction stage 225, a registration stage 230, a merger stage 235, a change detection stage 240, and a video-model mapping stage 245. At a high level, the frame selection stage 220 selects frames from video data for use in generating three-dimensional models. The reconstruction stage 225 processes the selected frames to generate three-dimensional models of the landscape or terrain captured in the frames. Because the three-dimensional model generated by the reconstruction stage 225 is in a model space independent of the geographic coordinate system, the registration stage 230 performs various operations on the model to generate a new model positioned within the geographic coordinate system. The merger stage 235 compares overlapping models in the geographic coordinate system to generate merged model(s). The merged models, which can include model data from non-overlapping models, form the three-dimensional map 110. The change detection stage 240 compares overlapping models to generate three-dimensional models that represent changes between the overlapping models, allowing users to view changes to the map over time. The video-model mapping stage 245 creates associations between the original video data and the three-dimensional map 110 to locate and enable viewing of the source data that contributed to the three-dimensional map 110. Additional details regarding each of these components are provided in FIGS. 3-16 and their associated descriptions.

The mapping system 100 has access to one or more data stores 280. In some embodiments, the data store(s) 280 include machine-readable storage media for storing or buffering data used and/or generated by the various stages of the mapping system 100 in generating a three-dimensional map 110. As shown, the data store(s) 280 include video data store 281, video metadata data store 282, selected frames data store 283, unregistered point clouds data store 284, correspondence data store 285, registered point clouds data store 286, transform and alignment data store 287, merged model data store 288, model to video mapping data store 289, change model data store 290, and base layer data store 291.

In some embodiments, one or more of the components illustrated in the data store(s) 280 are databases. The mapping system 100 may assign an identifier to videos upon receipt to uniquely identify the video and associated data. Such associated data may include other inputs or outputs of the mapping system 100 that are uniquely associated with a video (e.g., three-dimensional models, etc.). Thus, the video identifier may be used to index databases, such as one or more of the video data store 281, the video metadata data store 282, the selected frames data store 283, the unregistered point clouds data store 284, the correspondence data store 285, the registered point clouds data store 286, the transform and alignment data store 287, the model to video mapping data store 289, and the change model data store 290. In other embodiments, a data structure (e.g., a table in a database, a JSON file, etc.) may include a plurality of fields that include identifiers of the data associated with a video. The identifiers can be used to locate data in the data store(s) 280 (e.g., locations in memory or on a network that point to data on a block-based storage device). The data includes items such as a source video, the metadata associated with the video, the three-dimensional models associated with the video, etc. As stages of the mapping system 100 generate data associated with a particular video, the stage may store the data in the data store(s) 280 and update the data structure to identify the location where the data was stored. Other data storage schemes are possible. Additional details regarding the data stored in the data store(s) 280 is provided in the descriptions FIGS. 3-16 and their associated descriptions. Although subsequent description refers to locating videos and associated data using video identifiers, other data tracking schemes may be used.

Each of the components of the mapping system 100 may be considered a subsystem. In some embodiments, the mapping system 100 (or one or more subsystems) is implemented by one or more computer systems executing one or more computer programs (e.g., software, a set of instructions, etc.) stored in a memory that, when executed, cause the computer system(s) to carry out aspects of the present disclosure.

Frame Selection

Figure 3:
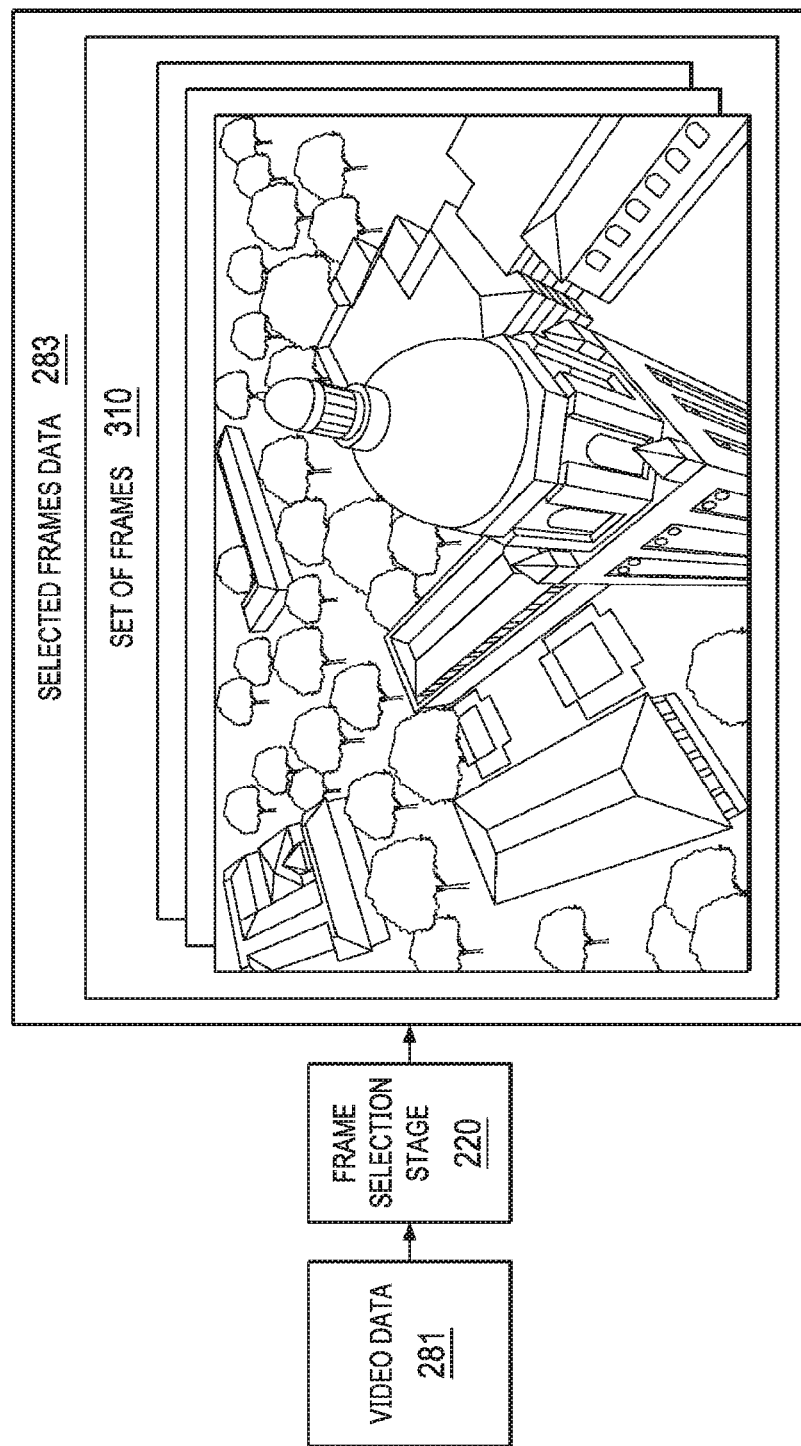
FIG. 3 illustrates a frame selection stage of a mapping system and associated inputs and outputs (I/O), according to some embodiments.

FIG. 3 illustrates a frame selection stage of a mapping system and associated inputs and outputs (I/O), according to some embodiments. As shown, the frame selection stage 220 takes as inputs video or image data from the video data store 281 and outputs a set of selected frames 310 to the selected frames data store 283.

The video data store 281 includes two-dimensional imagery provided by a user. As mentioned above, the mapping system 100 may support video or sets of images (e.g., from aerial cameras that take photographs at some interval). The video or images may be received in a variety of formats, such as JPEG or PNG images, H.26x video, etc.

The frame selection stage 220 reduces the amount of video data to increase the performance of subsequent stages. For example, a 10-minute video at 30- or 60-frames-per-second contains a large amount of data that can negatively impact the reconstruction process described below. To reduce the amount of video data without compromising the fidelity of a model generated by the reconstruction process, the frame selection stage 220 selects certain frames from a video in the video data store 281 (or images if the user provided a set of images) to eliminate intra-frame or image data redundancies. For example, if the platform recording imagery of a field of view remains stationary for a period of time, the resulting video or set images contain redundant information that can be discarded. After selecting frames, the frame selection stage 220 may store the set of selected frames 310 in the selected frames data store 283.

Figure 4:
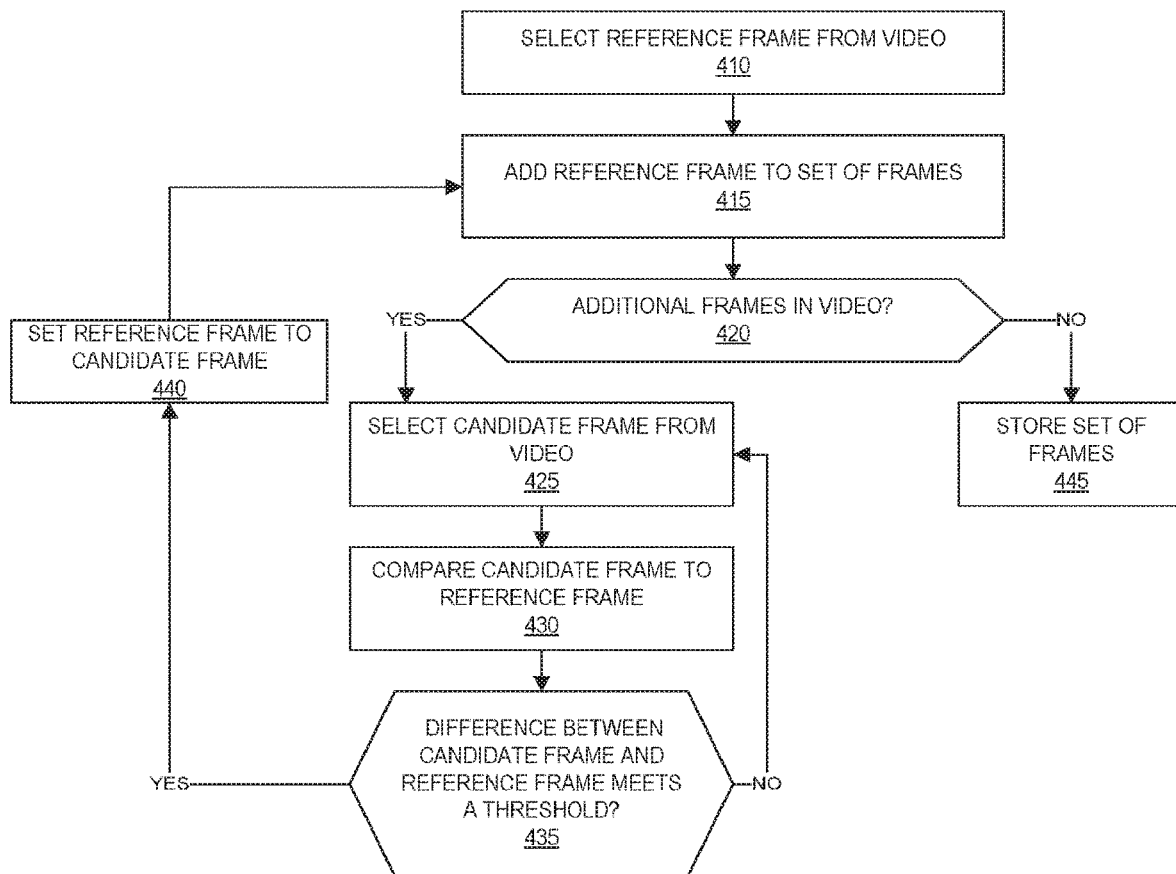
FIG. 4 illustrates a flow diagram of a process for frame selection, according to some embodiments.

FIG. 4 illustrates a flow diagram of a process for frame selection, according to some embodiments. The flow illustrated in FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the flow is performed by the frame selection stage 220 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, a processing device selects a reference frame from the video. In some embodiments, the selected frame is the first frame in the video (or image in a set of images). In other embodiments, frames are analyzed to identify an image with a low degree of pixel homogeneity to avoid selecting frames taken while the aerial recording platform was still on or close to the ground (where the field-of-view covered a small, uniform area of the ground) or had its camera aimed at the sky. For example, the frame selection stage 220 may calculate the standard deviation of the pixels in the image and select a frame with a standard deviation above some threshold. Having selected a starting reference frame, the processing device adds the reference frame to a set of frames that form the output at block 415.

At block 420, the processing device checks whether there are frames remaining in the video (or images in the set). If there are no images remaining to be processed, operations continue to block 445, described below. Otherwise, operations continue to block 425.

At block 425, the processing device selects a candidate frame from the video (e.g., the next frame in the video, the next image in the set of images). For example, the frame selection stage 220 may select the next frame in the video or may skip some number of frames from the previous reference frame. In the latter case, the frame selection stage 220 may select the Nth frame from the prior reference frame and in subsequent passes through block 425 select the N+1 frame, N+2 frame, etc., skipping N (e.g., 5, 10, etc.) frames after the prior reference frame before evaluating subsequent frames in the below operations.

At block 430, compares the selected candidate frame to the reference frame. For example, the frame selection stage 220 can perform the comparison by calculating a metric that relates the candidate and reference frames. One exemplary metric is the sum of absolute differences. Another exemplary metric can be derived from one or more motion vectors after applying a motion estimation algorithm to the candidate and reference frame. Other metrics may be used.

At block 435, the processing device determines whether the difference between the candidate and reference frames meets a threshold. In some embodiments, the threshold is determined empirically and may be based on the metric being used to compare the two frames. If the two frames are sufficiently different (e.g., the metric meets the threshold), operations continue to block 440. Otherwise, operations return to block 425 to select another candidate frame, as described above.

At block 440, having determined that the candidate frame is sufficiently different from the reference frame, the processing device identifies the candidate frame as the new reference frame. Operations continue to block 415, where the processing device adds the new reference frame to the set of frames that form the output at block 415.

At block 445, the processing device stores each of the set of selected reference frames associated with the processed video or set of images in the selected frames data store 283. In some embodiments, upon completing frame selection, the frame selection stage 220 issues an API call to the reconstruction stage 225 to initiate the generation of three-dimensional models from the set of selected frames 310, as described below.

In some embodiments, the frame selection stage 220 and associated processing may be omitted or skipped. For example, users may provide (or be restricted to providing) a limited number of images such as images recorded from aerial platforms that generate images at a relatively slow rate (e.g., 1 image per second). If the mapping system 100 allows users to upload video or low-rate image data, the frontend 215 may analyze the uploaded data to determine whether the frame selection stage 220 may be skipped, in some embodiments. For example, the frontend 215 may analyze the timestamps associated with the images to determine whether the rate of the images falls below a threshold and, if so, skip frame selection and initiate the reconstruction stage 225 on the received image data.

Other frame selection techniques are possible. For example, in some embodiments, the frame selection stage 220 may select key frames (or every Nth key frame) in videos compressed using inter-frame compression (e.g., I-frames in H.264 video). In other embodiments, the frame selection stage 220 selects every Nth frame from a video (e.g., every 30th frame of a 30 frames-per-second video).

Reconstruction

Figure 5:
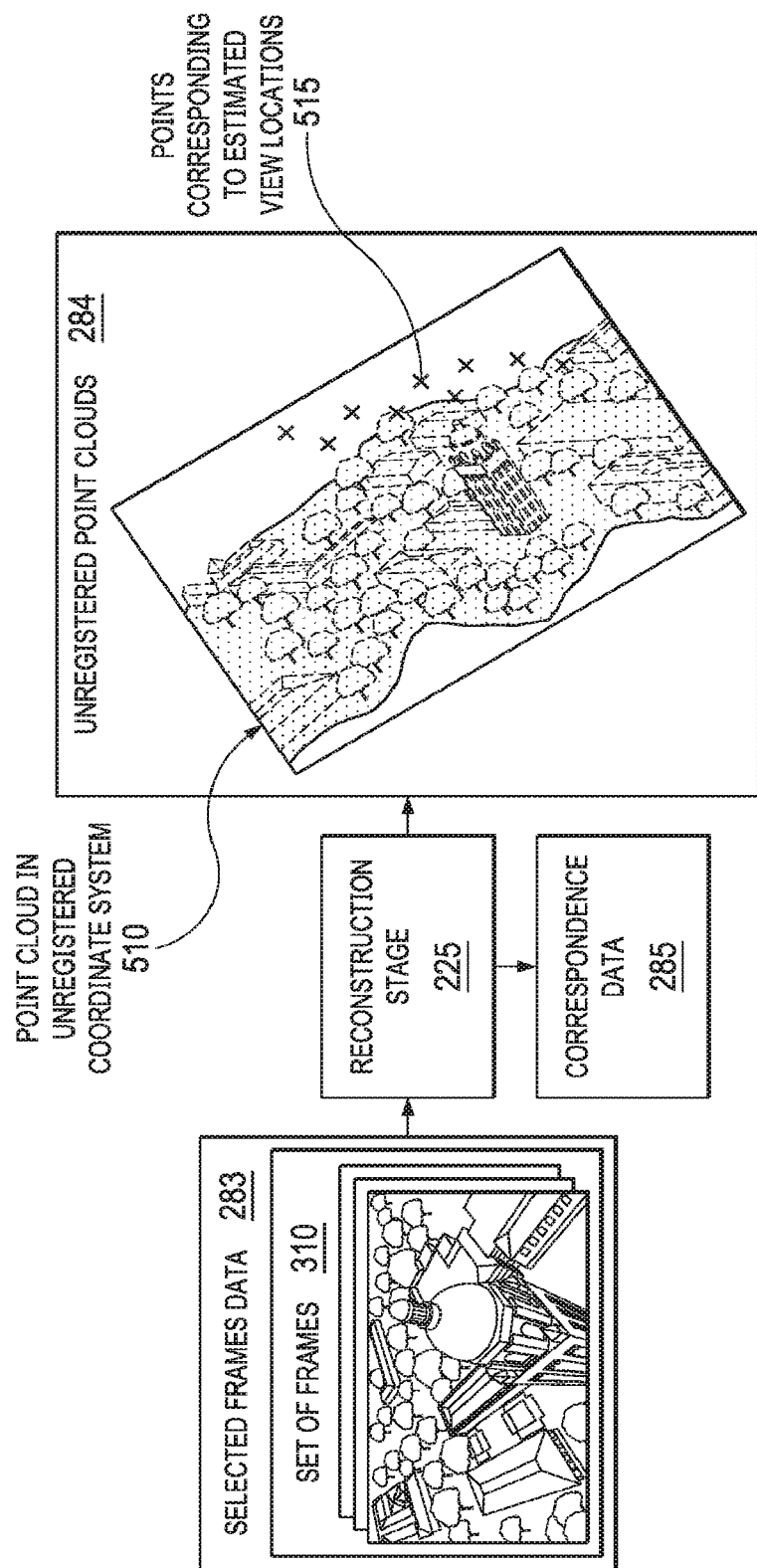
FIG. 5 illustrates a reconstruction stage of a mapping system and associated I/O, according to some embodiments.

FIG. 5 illustrates a reconstruction stage of a mapping system and associated I/O, according to some embodiments. As shown, the reconstruction stage 225 takes as inputs a set of selected frames 310 from the selected frames data store 283 and outputs an unregistered point cloud 510 and associated correspondence data to the data store(s) 280, e.g., the unregistered point clouds data store 284 and the correspondence data store 285, respectively. The unregistered point cloud 510 output from the reconstruction stage 225 is a three-dimensional model in a coordinate system that is localized to the model, unrelated to a geographic coordinate system. The point cloud includes point (or vertex) data to identify locations on the object(s) being modeled (referred to herein as "model" or "object" points or locations) in the model coordinate system, which, in this case, generally represents terrain features that were captured in the video or image data. In this example, the unregistered point cloud includes points corresponding to a scene captured in the set of frames 310. In addition to model points, the unregistered point cloud includes points corresponding to the estimated view or camera location in the model coordinate system for each image used in the reconstruction process (referred to as "view" or "camera" points or locations). The points representing the estimated view locations may be tagged to distinguish them from model points or stored separately from the model points. The correspondence data store 285 includes correspondence data that associates regions in the video or images (e.g., pixels) with corresponding locations in the model space (e.g., vertices). Separate correspondence data may exist for each set of frames 310 and resulting unregistered point cloud 510. In addition, the correspondence data can include a mapping between individual frames in the set of frames and the corresponding estimated view location in the unregistered point cloud.

In some embodiments, three-dimensional model reconstruction from two-dimensional image data generally includes identifying features in each of the selected images, matching identified features between images, estimating the view locations for each image based on the matched features, generating a depth map for each image based on the view locations, and combining the depth maps to generate the three-dimensional model (e.g., a point cloud). Exemplary open-source tools to aid in the reconstruction process include OpenCV (Open Source Computer Vision), OpenMVG (Multiple View Geometry), and MVE (Multi-View Environment).

Although three-dimensional models are frequently illustrated and described herein as point clouds, the mapping system 100 can operate using one or more other three-dimensional model representations (e.g., meshes). Thus, the use of the term "point cloud" herein is intended as descriptive and not limiting, and subsequent references to point clouds are equally applicable to other types of three-dimensional models.

Figure 6:
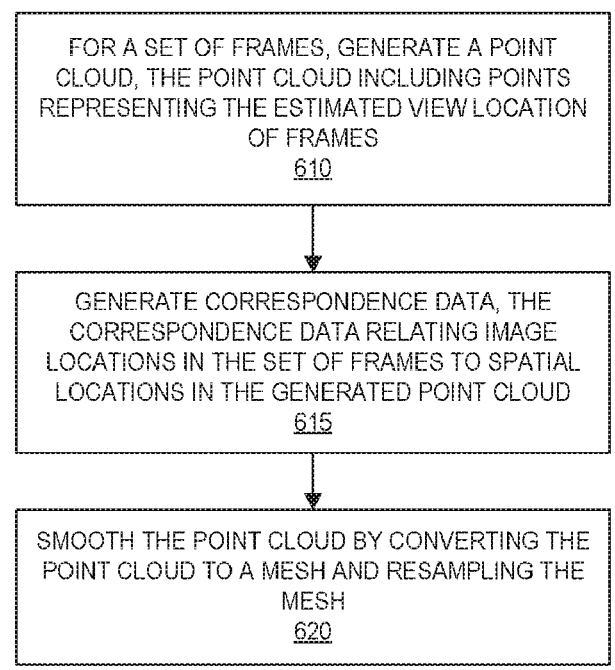
FIG. 6 illustrates a flow diagram of a process for reconstruction, according to some embodiments.

FIG. 6 illustrates a flow diagram of a process for reconstruction, according to some embodiments. The flow illustrated in FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the flow is performed by the reconstruction stage 225 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 610, a processing device generates a point cloud for a set of frames, the point cloud including points representing the estimated view location of frames. For example, the reconstruction stage 225 identifies and matches features between images using OpenCV, estimates view locations using OpenMVG, and generates depth maps and the point cloud modeling the terrain surface captured in the set of images using MVE.

At block 615, the processing device generates correspondence data, the correspondence data relating image locations in the set of frames to spatial locations in the generated unregistered point cloud relative to the model coordinate system. For example, the MVE tool outputs correspondence data relating the pixel locations in the depth maps to the vertices in the point cloud.

At block 620, the initial point cloud generated using MVE is further processed by smoothing and/or resampling. For example, the reconstruction stage 225 may generate a mesh from the point cloud generated at block 610 and resample points on the mesh to generate a smoothed point cloud.

In some embodiments, color data is included or associated with each of the points in the point cloud. The color data may be determined based on the pixel or group of pixels that were included in the identified and matched features (e.g., an average color) or from a region in the image(s) corresponding to the resampled model.

Once the reconstruction stage 225 has generated an unregistered point cloud and correspondence data for a set of frames, the reconstruction stage 225 stores the generated unregistered point cloud 510 for the video in the unregistered point clouds data store 284 and the generated correspondence data for the video in the correspondence data store 285. In some embodiments, upon completing reconstruction, the reconstruction stage 225 issues an API call to the registration stage 230 to initiate registration of the unregistered point cloud to a geographic coordinate system, as described below.

Registration

FIG. 7 illustrates a registration stage of a mapping system and associated I/O, according to some embodiments. As shown, the registration stage 230 takes as inputs an unregistered point cloud from the unregistered point clouds data store 284, metadata associated with the video used to generate the unregistered point cloud from the video metadata data store 282, and a reference model from the base layer data 291. The registration stage 230 outputs transform and alignment data to the transform and alignment data store 287 and a registered point cloud 715 to the registered point clouds data store 286.

After the reconstruction stage 225, the resulting unregistered point cloud is in its own model space, unrelated to a geographic coordinate system. To convert the point cloud to a geographic coordinate system, an exemplary registration stage 230 transforms the unregistered model to the geographic coordinate system using the metadata associated with the video from which the unregistered model was generated. The transform maps locations in the model space (e.g., an x, y, z coordinate of the unregistered model) to corresponding locations in the geographic coordinate system (e.g., latitude, longitude, and elevation; ECEF; etc.) by performing one or more linear transforms (e.g., rotation, scaling, translation, etc.). The registration stage 230 calculates the transform(s) by calculating a transformation matrix that solves a system of equations. The system of equations is characterized by the correspondence between the estimated view locations 515 of an unregistered point cloud (in the model coordinate system) and the corresponding locations of the actual location 710 of the camera (in a geographic coordinate system) associated with the frames used to generate the unregistered point cloud, such as GPS data associated with the video from the video metadata data store 282. In other words, the registration stage 230 solves for a matrix T such that y=T·x where y is a vector that includes a three-dimensional coordinate corresponding to an actual view or camera location 710 and x is a vector that includes a three-dimensional coordinate corresponding to an estimated view location 515. In some embodiments, the registration stage 230 uses an optimization algorithm to solve for the matrix T as both the estimated view locations 515 and the actual locations 710 may include errors (e.g., from the reconstruction stage 225 or noise in the GPS data). For example, the registration stage 230 may introduce a degree of freedom in each of the parameters of the matrix T and iteratively adjust the matrix T to minimize the distance between each vector-pair y and transformed T·x. The registration stage 230 stores the calculated transform, T, in the transform and alignment data store 287 and applies the transform to the model points in the unregistered point cloud to generate a transformed point cloud.

In some embodiments, the transformed point cloud is subjected to further adjustments to align the transformed point cloud with a reference model, such as a model contained in the base layer data 291, that overlaps at least a portion of the region in the geographic coordinate system that includes the transformed point cloud. Such a reference model may be a high-precision model, such as those generated using LIDAR-based terrain mapping data. In some embodiments, the further adjustment is determined using optimization techniques. For example, the registration stage 230 may iteratively adjust the relative location of the transformed point cloud within the geographic coordinate system and compare the adjusted, transformed point cloud to the reference model, as described below. By performing the additional adjustments based on a reference model, the transformed and adjusted model can achieve a high degree of accuracy (e.g., less than 50 centimeters relative to the ground truth). If a reference model is unavailable, the transformed point cloud may be used as a registered point cloud.

Figure 8A:
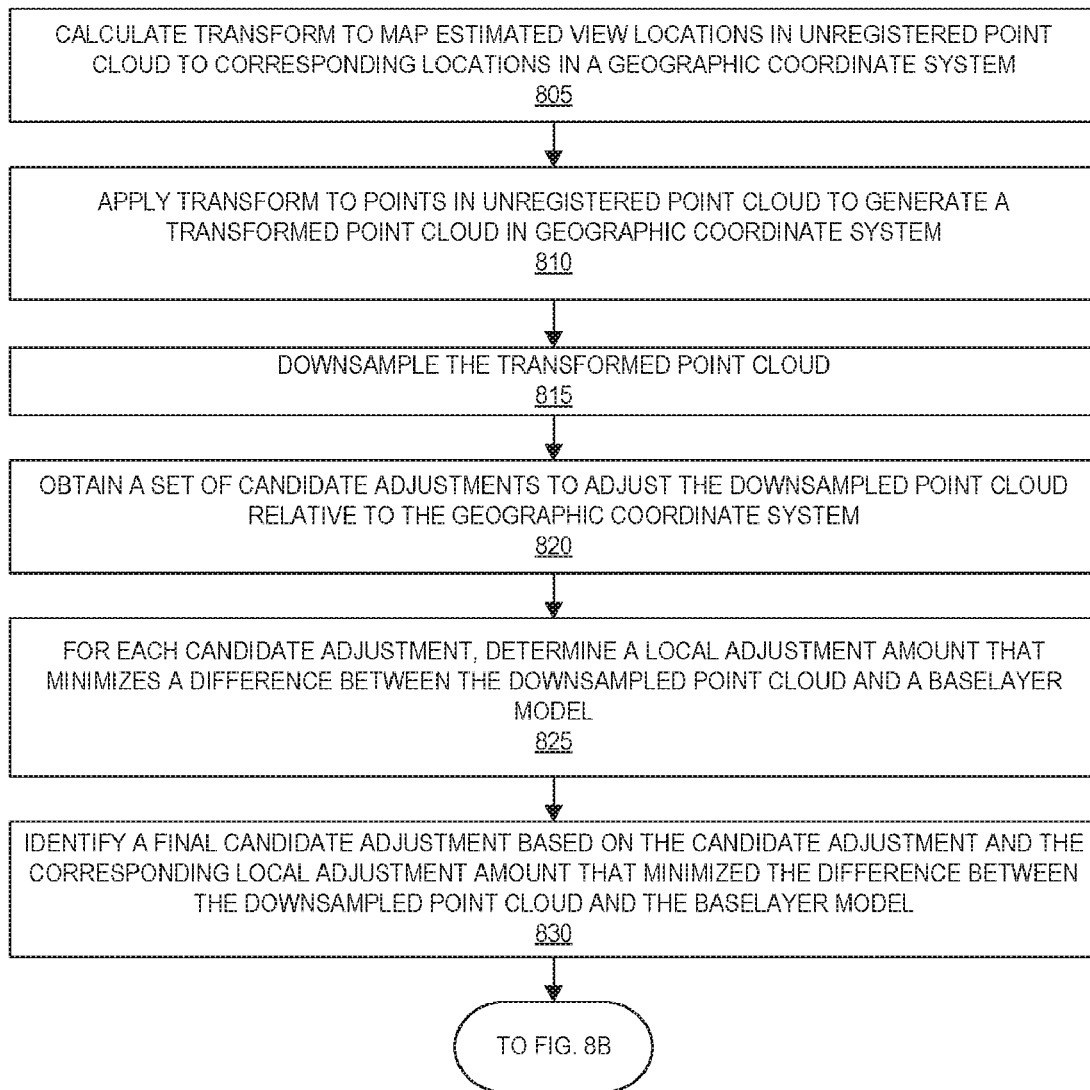
FIGS. 8A and 8B illustrate a flow diagram of a process for registration, according to some embodiments.
Figure 8B:
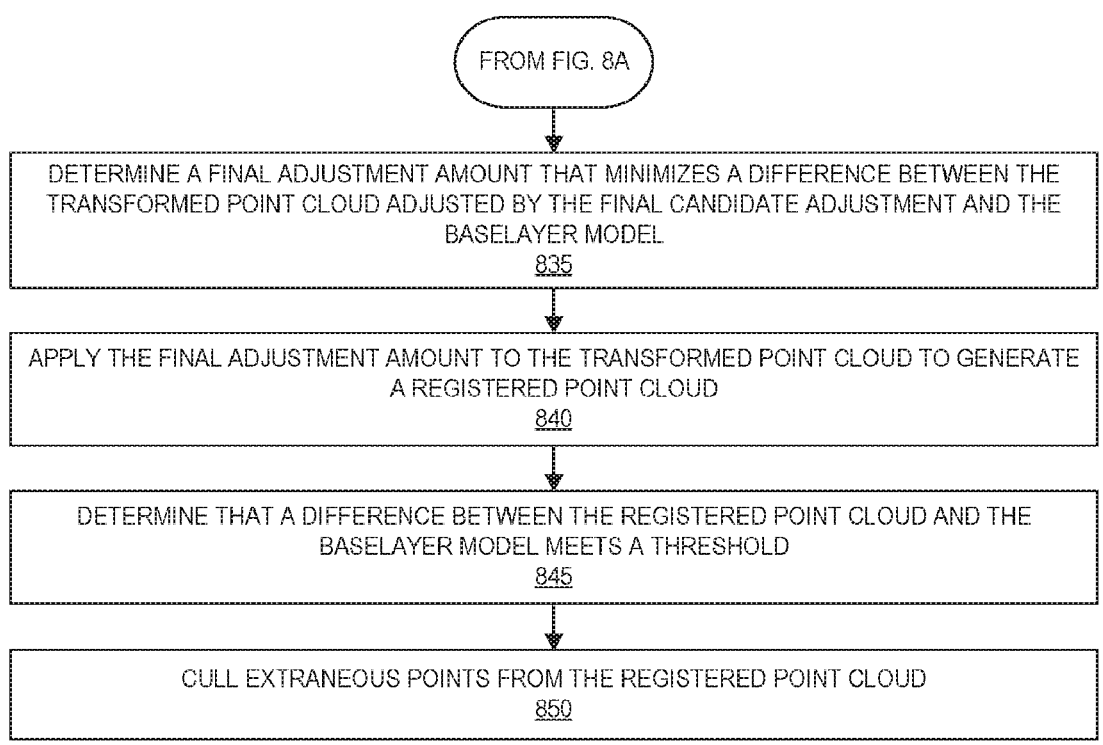

FIGS. 8A and 8B illustrate a flow diagram of a process for registration, according to some embodiments. The flows illustrated in FIGS. 8A and 8B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the flows are performed by the registration stage 230 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 805, a processing device calculates a transform to map the estimated view locations in an unregistered point cloud to corresponding locations in a geographic coordinate system. For example, the registration stage 230 can access the correspondence data store 285 from the reconstruction stage 225 to obtain correspondence data that relates the estimated view locations in the unregistered point cloud to the frames that were the inputs to the reconstruction process. The registration stage 230 can use the identification of those frames to obtain GPS coordinates associated with each of the frames from the metadata associated with the frames in the video metadata data store 282. Using the estimated view locations and corresponding GPS locations as candidate points, the registration stage 230 can then solve for a transform matrix T that y=T·x, where x is a vector including a coordinate in the unregistered point cloud space and y is a vector including a coordinate in the geographic coordinate system. The registration stage 230 can store the calculated transform in the transform and alignment data store 287.

At block 810, the processing device applies the transform to the model points (e.g., the non-estimated view locations) in the unregistered point cloud to generate a transformed point cloud in the geographic coordinate system. This step transforms the three-dimensional model from the model coordinate space to the geographic coordinate system. The position of the transformed model may be inaccurate, however, due to inaccuracies in the GPS data and the estimated view locations calculated by the reconstruction process.

To improve the positional accuracy of the transformed model in the geographic coordinate system, further adjustments may be performed. In an exemplary embodiment, the registration stage 230 performs an iterative optimization technique to align the transformed point cloud within the geographic coordinate system. Blocks 815 through 830 relate to an initial alignment of the model, while blocks 835 and 840 relate to a refined alignment based on the initial alignment.

At block 815, the processing device downsamples the transformed point cloud. This step may be performed to improve the computational performance of the subsequent operations. The downsampling factor or ratio may be based on the density of the point cloud (e.g., in terms of points per square meter).

At block 820, the processing device obtains a set of candidate adjustments to adjust the downsampled point cloud relative to the geographic coordinate system. The candidate adjustments are used to ensure that the optimization technique finds a global rather than a local solution. In some embodiments, the candidate adjustments are empirically determined. In other embodiments, the candidate adjustments are based on error margins in the actual locations 710 (e.g., in the GPS data). For example, the registration stage 230 may obtain a set of candidate adjustments for a grid-based search. An exemplary grid may adjust the positioning of the downsampled model±20 meters in 5-meter increments in each dimension of the geographic coordinate system (for a total of 729 candidate adjustments).

At block 825, the processing device determines, for each candidate adjustment, a local adjustment amount that minimizes a difference between the downsampled point cloud and a base layer model. As used here, the term local is relative to the starting candidate adjustment, which may or may not correspond to an optimal global adjustment. The registration stage 230 may employ an optimization algorithm to determine the local adjustment amount. In one embodiment, the registration stage 230 employs the gradient descent algorithm to minimize the difference between the downsampled point cloud and the base layer model. For example, the difference may be defined using an objective function that is the sum of the distances between points in the downsampled point cloud (as adjusted by the candidate adjustment) and the corresponding nearest points in the base layer model. In some embodiments, the registration stage 230 applies an inverse falloff to reduce the contribution of large distances. Such an inverse falloff can be useful to focus the comparison on the topographical features of the model (e.g., to prevent a large building absent in the base layer model from introducing a negative elevation shift in the solution). Other optimization techniques are possible.

At block 830, the processing device identifies a final candidate adjustment based on the candidate adjustment and the corresponding local adjustment amount that minimized the difference between the downsampled point cloud and the base layer model. For example, the registration stage 230 may identify the final candidate adjustment amount based on the smallest error from each of the optimized candidates. If the smallest error was attributed to a candidate with an initial offset of −5, +5, +5 meters in a geographic coordinate system and an optimized local adjustment amount of +2, −1, +1 meters, the final candidate adjustment is −3, +4, +6 meters relative to the original location of the transformed model. In some embodiments, the registration process may stop after calculating an initial alignment.

Continuing to FIG. 8B, at block 835, the processing device determines a final adjustment amount that minimizes a difference between the transformed point cloud adjusted by the final candidate adjustment and the base layer model. As at block 825, the registration stage 230 may employ an optimization algorithm to determine the final adjustment amount, again, for example, using a gradient descent algorithm as described above. In contrast to the operations at block 825, the registration stage 230 optimizes using the full transformed model (rather than the downsampled model).

At block 840, the processing device applies the final adjustment amount to the transformed point cloud to generate a registered point cloud. In particular, the registration stage 230 adjusts the coordinate of each point within the transformed point cloud by the final adjustment amount.

At block 845, the processing device determines that a difference between the registered point cloud and the base layer model meets a threshold. This comparison can help avoid introducing or using incorrect models in subsequent portions of the mapping system 100. Incorrect models may arise from the reconstruction stage 225, which can produce distorted models, models with a large number of artifacts that do not correspond to real-world objects, or from transformations based on metadata including erroneous GPS data. To perform this determination, the registration stage 230 may measure the distance between each point in the registered point cloud (post-transform and adjustment) and the nearest point in the base layer model. If the distance is below a threshold (e.g., 50 centimeters), the point is classified as good. The registration stage 230 compares the overall number of points in the registered point cloud that were classified as good to another threshold to classify the registered point cloud as correct or incorrect. For example, if greater than 60% of points in the registered point cloud are classified as good, the registered point cloud is determined to be correct. If the registered point cloud model is correct, the registered point cloud is used in subsequent stages of the mapping system 100. Otherwise, the registered point cloud is discarded.

At block 850, the processing device culls extraneous points from the registered point cloud. Even when a registered model is classified as correct, the model may still contain artifacts from the reconstruction process. The registration stage 230 performs a cull operation to eliminate these artifacts. Cull operations may be performed using statistical techniques. For example, the registration stage 230 may calculate the mean and standard deviation of the points in a model for each dimension. Points that are statistical outliers in one or more dimensions (e.g., three standard deviations from the mean) may be discarded.

In some embodiments, the registration stage 230 associates the registered point cloud with one or more indices of a region indexing system, such as the S2 geometry. The S2 geometry divides the earth into regions called cells. Multiple levels of cells exist, with cells at the lowest level each representing $1 16^{th}$ of the earth and cells at the highest level representing regions of less than 1 square centimeter of the earth. By associating the registered point cloud with one or more indices of the indexing system, subsequent stages can easily identify other models that overlap a model of interest based on the index or indices of the regions that include the model of interest. For example, the mapping system 100 can maintain two lookup tables. A first lookup table can correlate a video or other identifier that is uniquely associated with a registered point cloud to one or more indices of regions of the region indexing system within which the registered point cloud includes points. For example, the mapping system 100 can lookup video identifier X in the first lookup table to determine that the corresponding registered point cloud includes points in regions 10, 11, and 12 of the region indexing system. A second lookup table can correlate indices of the region indexing system to one or more video or other identifiers that uniquely identify registered point clouds that include points within that region. For example, the mapping system 100 can lookup region index 10 in the second lookup table to determine that the region includes points from registered point clouds associated with video identifiers X and Y and base layer model Z. Thus, to identify models overlapping a particular model, the mapping system 100 can use the first lookup table to identify the regions that bound the model and the second lookup table to identify the other model or models associated with the identified regions.

Once the registration stage 230 has generated a registered point cloud, the registration stage 230 stores the registered point cloud in the registered point clouds data store 286. In some embodiments, once a registered point cloud has been generated, the registration stage 230 issues an API call to the merger stage 235, the video-model mapping stage 245, and/or the change detection stage 240, as described below.

Merger

Figure 9:
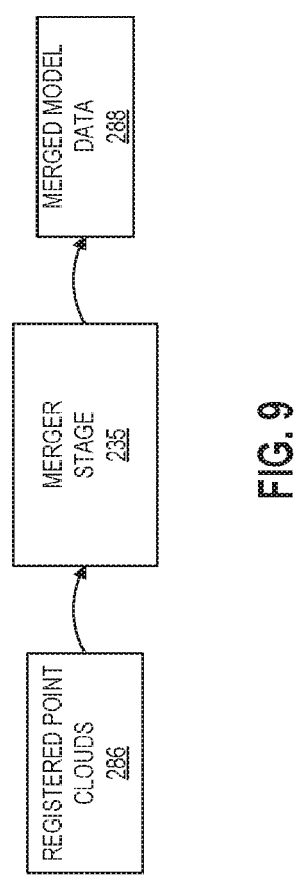
FIG. 9 illustrates a merger stage of a mapping system and associated I/O, according to some embodiments.

FIG. 9 illustrates a merger stage of a mapping system and associated I/O, according to some embodiments. As shown, the merger stage 235 takes as input one or more registered point clouds from the registered point clouds data store 286 and outputs a merged point cloud to the merged model data store 288. The merged models stored in the merged model data store 288 form the three-dimensional map 110.

Because the mapping system 100 collects data from many different sources, it is possible for the same geographic region to have many overlapping registered models. The performance of the mapping system 100 could suffer if all the points from all the registered point clouds were used in the three-dimensional map 110. For example, if all points from all registered point clouds were included, the computational effort associated with data storage and retrieval operations, including moving data within the mapping system 100 and to or from client computing device 205 would scale linearly with the number of points in the three-dimensional map 110. In addition, some portions of a registered point clouds may be more accurate that other regions. For example, often geometries determined during the reconstruction process are more accurate in geographic regions that included more or direct coverage. Thus, geographic regions that are briefly visible in or located at the edges of the source imagery may produce lower quality models than regions that are visible from many different angles in the source imagery. To avoid performance degradation and increase the quality of the three-dimensional map 110, the merger stage 235 evaluates registered point clouds covered in the same geographic area to identify the portions of the point clouds having the highest quality. In an exemplary embodiment, point density is used as a proxy for quality, as models generated via reconstruction are generally more accurate in regions with more points. The merger stage 235 combines the identified portions of the registered point clouds into a merged point cloud that includes points from one or more registered models.

Figure 10:
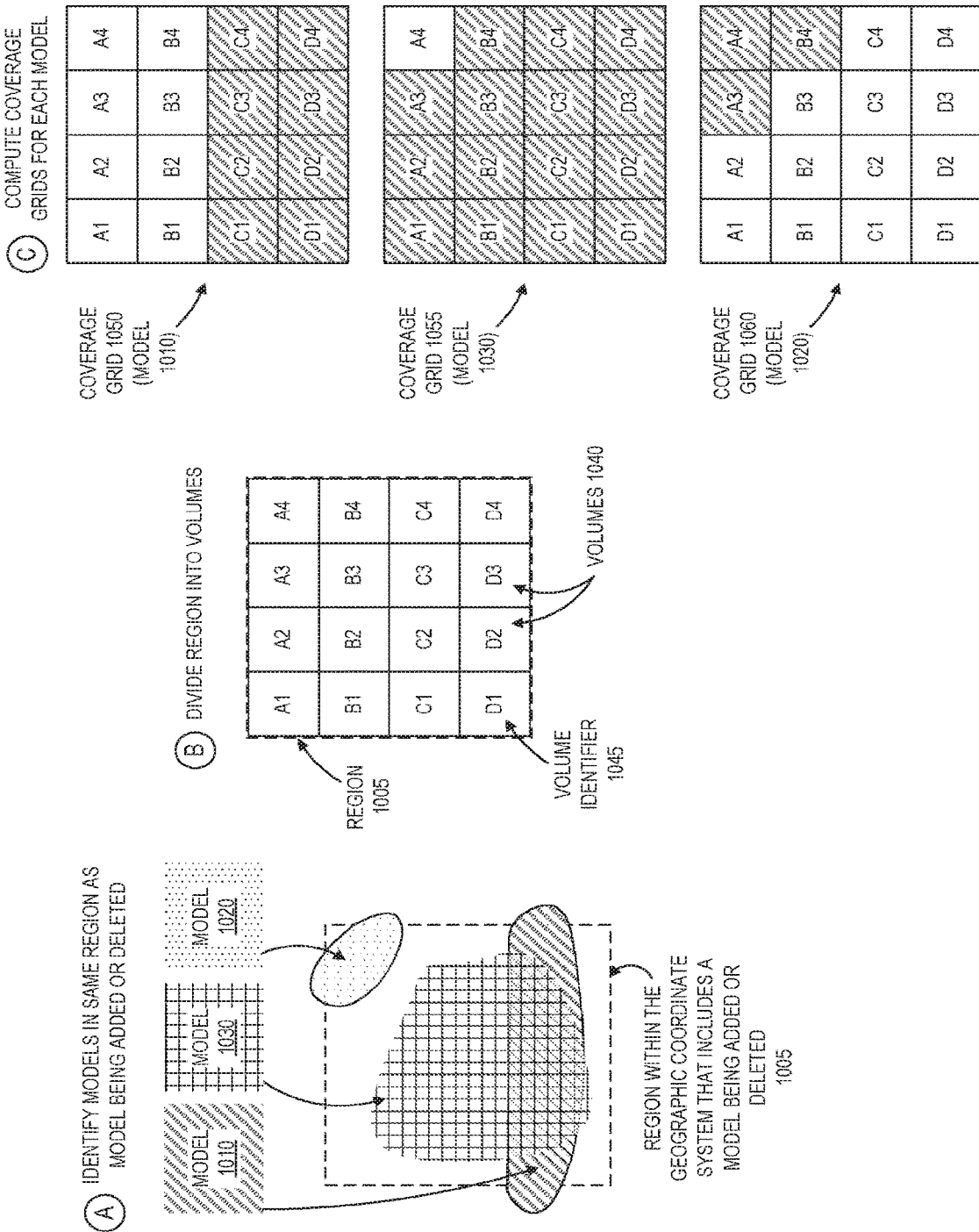
FIGS. 10 and 11 illustrate aspects of the merger process, according to some embodiments.
Figure 11:
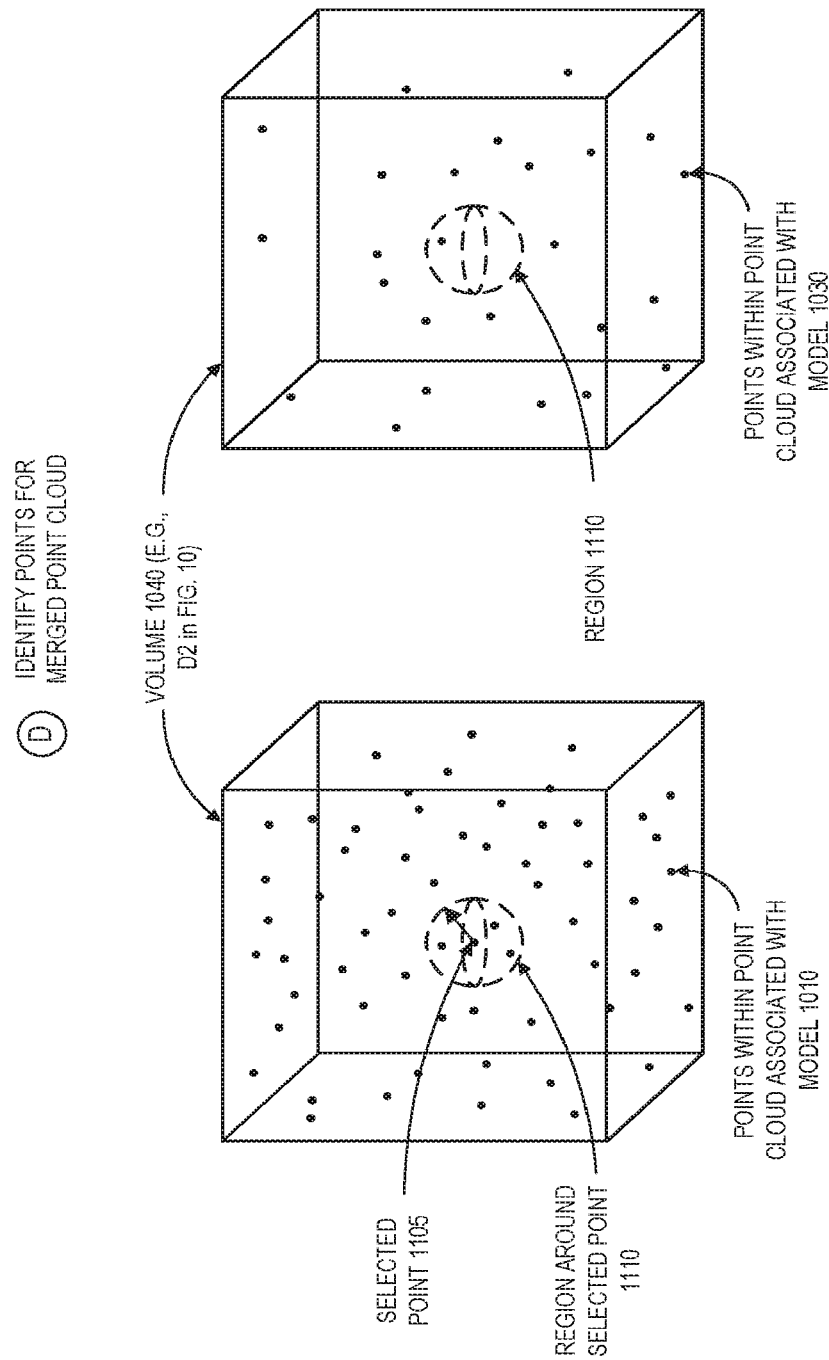

FIGS. 10 and 11 illustrate aspects of the merger process, according to some embodiments. The illustrated aspects reduce the computational complexity of the merger problem, both for identifying and comparing overlapping registered point clouds. Initially, as indicated at the encircled letter "A," the merger stage 234 identifies models that overlap with a model being added or deleted. Here, model 1030 is a new model (e.g., a new registered point cloud) being merged with other models of the three-dimensional map 110. As indicated by the hatching, model 1030 is bounded by a region 1005, which can be used to identify other models that may have overlapping data. In one embodiment, region 1005 is defined by one or more cells in the S2 geometry. The merger stage 234 can use the index of the cell or indices of the cells to identify associated registered point clouds within the cell. In this example, region 1005 also includes models 1010 and 1020, indicated by the diagonal and dotted patterning, respectively. Note that models 1010 and 1020 may extend outside of the region 1005. Also note that the two-dimensional illustrations in FIG. 10 can be considered, e.g., a top-down view of a region of a three-dimensional geographic coordinate system. As indicated at circle "B," the region 1005 is subdivided into volumes 1040. Each volume 1040 has a volume identifier 1045.

As indicated at circle "C," the merger stage 234 generates coverage grids for each of the models based on the subdivided region 1005. Note that in the case of model deletion, the merger stage 235 ignores the model being deleted and proceeds based on the other models in the region 1005. Coverage grids reduce the computational complexity of the merger process by reducing the number of model-to-model comparisons based on overlap of the subdivided volumes 1040. For example, coverage grid 1050 corresponds to model 1010, indicating model 1010 has points in volumes C1-C4 and D1-D4; coverage grid 1055 corresponds to model 1030, indicating model 1030 has points in each of the volumes of the coverage grid except volume A4; and coverage grid 1060 corresponds to model 1020, indicating model 1020 has points in volumes A3, A4, and B4. In response to determining models 1020 and 1030 in the exemplary coverage grids each have points in volumes C1-C4 and D1-D4, the merger process will evaluate volumes C1-C4 and D1-D4 for potential merger. In response to determining models 1020 and 1030 each have points in volumes A3 and B4, the merger process will evaluate volumes A3 and B4 for potential merger. Note that the model data of model 1030 in volumes A1, A2, and B1-B3 can be incorporated into the three-dimensional map 110 without further evaluation as it represents the best available data (being the only model in those areas). If model 1030 were being deleted, the merger process can incorporate the model data of models 1010 and 1020 into the three-dimensional map 110 without further evaluation as there was no overlap between models 1010 and 1020 (and model 1030 data was ignored).

Note that in some embodiments, the region 1005 corresponds to one or more cells of the S2 geometry, and the subdivided volumes correspond to cells at a higher level (smaller size). Although region 1005 is illustrated as a square, the actual region 1005 that bounds a model may have an irregular shape formed of adjacent squares.

Continuing to FIG. 11, as indicated at circle "D," the merger stage 235 identifies points from the overlapping models for the merged point cloud. As indicated above, model quality may be evaluated based on point density, although other criteria may be used to evaluate model quality, as described below. In this illustration, the merger stage 235 identifies models 1010 and 1030 as overlapping a volume 1040 (e.g., volume D2). The left volume 1040 corresponds to points in model 1010 and the right volume 1040 corresponds to points in model 1030. The merger stage 235 evaluates each point in each model volume by comparing the density of points in a region 1110 around a selected point 1105 in one model with the density of points in the same region 1110 in the other model. Note that if the merger stage 235 identifies more than two models as overlapping a region, the comparison is performed against the corresponding regions in each model. If the density of points in the region 1110 around the selected point is greater than the density of points in the corresponding regions 1110 of the other models, the selected point is added to a merged model for the region. Note that while the volume 1040 circumscribes the points to be selected for evaluation, the region 1110 may extend outside of the volume 1040 to capture points that contribute to the point density of the model. Once a merged model has been generated for each volume 1040, the merger stage 235 combines the merged models for each volume 1040 to create a merged model for the region 1005.

Figure 12:
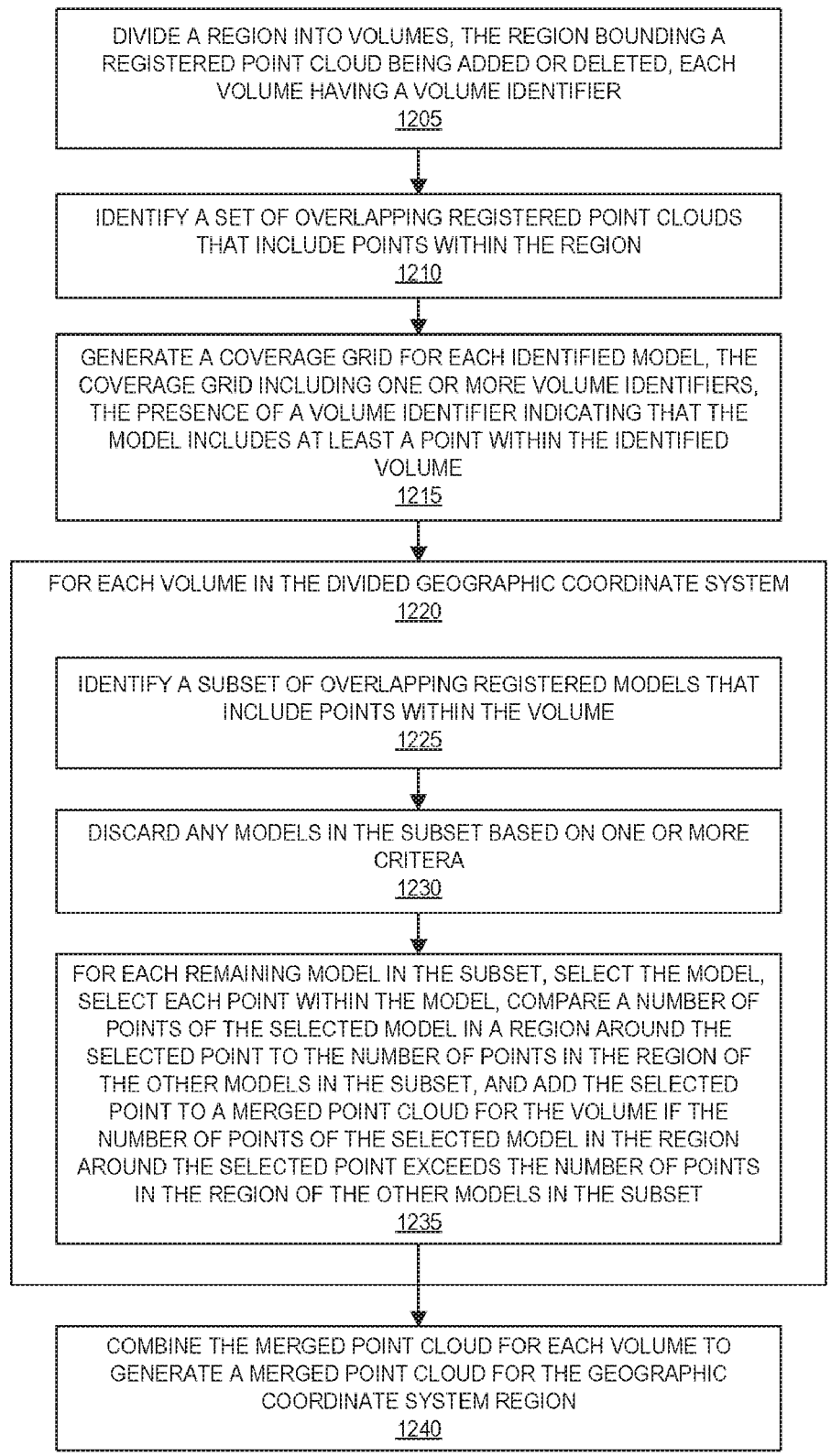
FIG. 12 illustrates a flow diagram of a process for merger, according to some embodiment.

FIG. 12 illustrates a flow diagram of a process for merger, according to some embodiments. The flow illustrated in FIG. 12 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the flow is performed by the merger stage 235 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1205, a processing device divides a region into volumes, the region bounding a registered point cloud being added or deleted, each volume having a volume identifier. For example, the merger stage 235 identifies the region bounding a registered three-dimensional model (e.g., being added or deleted from the mapping system 100). In some embodiments, the merger stage 235 identifies the index or indices of the regions associated with the indexing system based on the first lookup table that maps video identifiers to regions in the indexing system, described above. Once the merger stage 235 has identified the region, the merger stage 235 can subdivide the region into a plurality of volumes, such as is described above with reference to circle "B" in FIG. 10.

At block 1210, the processing device identifies a set of overlapping registered point clouds that include points within the region. For example, the merger stage 235 may access the second lookup table that relates indices of the region indexing system to models having data within the associated region, described above, to identify overlapping models. Note that if the merger stage 235 does not identify any overlapping models, the merger stage 235 may skip subsequent stages and either add or remove the entirety of the new registered three-dimensional model to the merged model data store 288.

At block 1215, the processing device generates coverage grids for the identified models (e.g., the model being added or deleted and any overlapping models). For example, the merger stage 235 generates coverage grids as described above with reference to circle "C" in FIG. 10. The generation of coverage grids can improve the performance of the subsequent per-point computations of the merger process by increasing its parallelism.

As indicated at block 1220, the operations contained therein are performed for each of the volumes based on the division at block 1205.

At block 1225, the processing device identifies a subset of the overlapping registered models that include points within the volume. Again, based on the exemplary coverage grids in FIG. 10, the merger stage 235 can identify models 1010 and 1030 for volumes C1-C4 and D1-D4 and models 1020 and 1030 for volumes A3 and B4. Again, if one of the volumes only includes data from a single model (e.g., model 1030 in volumes A1-A2 and B1-B3), the merger stage 235 may skip subsequent stages and either add or remove all points associated with that model to a merged point cloud for the volume. In cases where a model is being deleted, the subset does not include the model being deleted.

At block 1230, the processing device discards models in the subset based on one or more criteria. Exemplary criteria include recency of data, density of models, and total number of models. Other criteria may be used. For example, the merger stage 235 can evaluate models based on the creation date of the underlying imagery to identify significant changes (e.g., a new or demolished building, etc.). Starting with the model associated with the most recent imagery, the merger stage 235 can compare prior models to evaluate the presence of such changes. For example, the merger stage 235 can compare statistical parameters of the elevation dimension of points in the models. If two models exhibit statistically significant differences in elevation data, the older of the two models and any older models in the subset may be discarded from the subset. As another example, the merger stage 235 can evaluate models based on their point density within the volume. If density is used a proxy for model quality, models including a point density within the volume lower than a threshold may be discarded from the subset. As yet another example, the merger stage 235 can evaluate the number of models that remain in the subset (after discarding based on other criteria) and discard any models above a threshold (e.g., the five most recent models or five random models from the subset) to improve the performance of the operations associated with the next blocks. In some embodiments, the merger stage 235 may discard either a portion or the entirety of the older model in the volume.

At block 1235, the processing device selects a model from the remaining models in the subset, selects a point within the model, compares a number of points of the selected model in a region (e.g., region 1110) around the selected point to the number of points in the same region of the other remaining models in the subset, and adds the selected point to a merged point cloud of the volume if the number of points in the region around the selected point of the selected model exceeds the number of points in the region of the other models in the subset. This exemplary density comparison technique is illustrated in FIG. 11 and described above.

At block 1240, the processing device combines the merged point cloud for each volume to generate a merged point cloud for the geographic coordinate system region. For example, the merger stage 235, having performed density comparisons on each volume division of the region encompassing the model being added or deleted can combine each of the resulting merged models for the volumes as a merged point cloud for that region. Again, the region may correspond to one or more cells of a geographic indexing system, and the portions of merged point clouds for each volume associated with the respective cells of the geographic indexing system.

Other techniques to merge overlapping models in the geographic coordinate system are possible. For example, in some embodiments, the merger process may simply select the more recent of the two registered models or the registered model with the overall highest density to use as part of the three-dimensional map 110 wherever two or more models intersect.

Once the merger stage 235 has generated a merged point cloud, the merger stage 235 stores the merged point cloud in the merged model data store 288.

Video to Model Mapping

Figure 13:
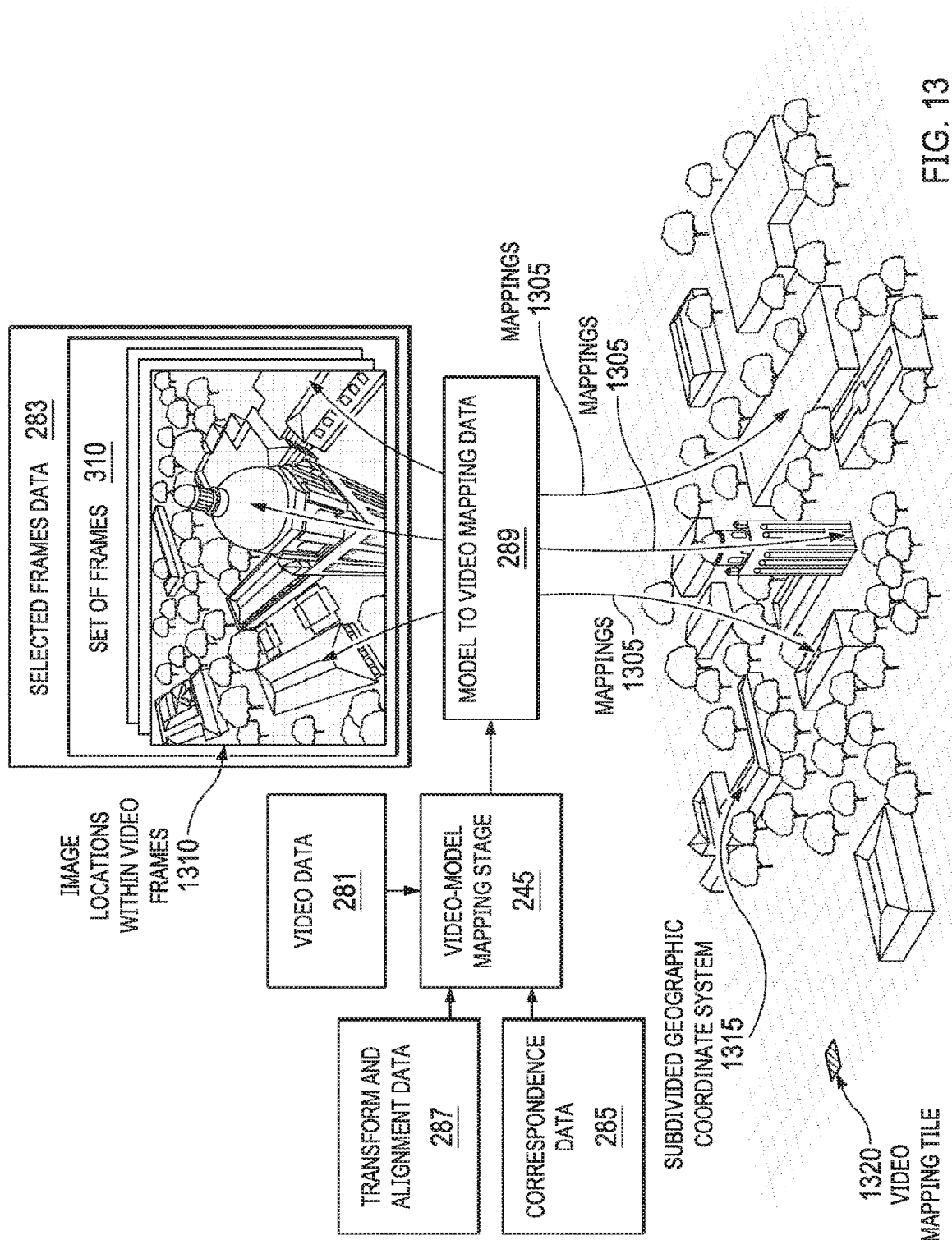
FIG. 13 illustrates a video to model mapping stage of a mapping system and associated I/O, according to some embodiments.

FIG. 13 illustrates a video to model mapping stage of a mapping system and associated I/O, according to some embodiments. As shown, the video-model mapping stage 245 takes as inputs data from the transform and alignment data store 287 and data from the correspondence data store 285. The video-model mapping stage 245 outputs model to video mapping data store 289. At a high level, the video-model mapping stage 245 creates linkages between the source, two-dimensional video or image data, and regions in the three-dimensional map 110. For example, a user can select a building model displayed in the three-dimensional map 110, and the mapping system 100 can provide the user with the native image or video data that includes the building. The mapping system 100 can provide the user with a video that includes the building, allowing the user to start review of the video at a frame in the video in which the building first appeared. These linkages, or mappings 1305, are stored in the model to video mapping data store 289. Mappings 1305 may be bidirectional, allowing the mapping system 100 to locate a location in the geographic coordinate system based on a location in a video, or the mapping system 100 to locate a location in a video based on a location in the geographic coordinate system.

To provide accurate mappings 1305, the mapping system 100 uses a subdivided geographic coordinate system 1315. Each subdivision corresponds to a video mapping tile 1320. In some embodiments, video mapping tiles 1320 correspond to cells at a particular level within the S2 geometry. The mappings 1305 associate image locations 1310 (e.g., pixels or groups of pixels within an image or frame) with a corresponding video mapping tile 1320.

In some embodiments, the model to video mapping data store 289 includes a database indexed by a geographic region corresponding to a video mapping tile 1320. Thus, a user selection of a particular region of the three-dimensional map 110 can be used to identify all associated source video or imagery associated with the selected region. The video to model mapping data store 289 may also include a database that maps image locations to regions of the three-dimensional map 110, to allow a user viewing source imagery to "center" the three-dimensional map 110 at an area of interest in the source imagery.

Figure 14:
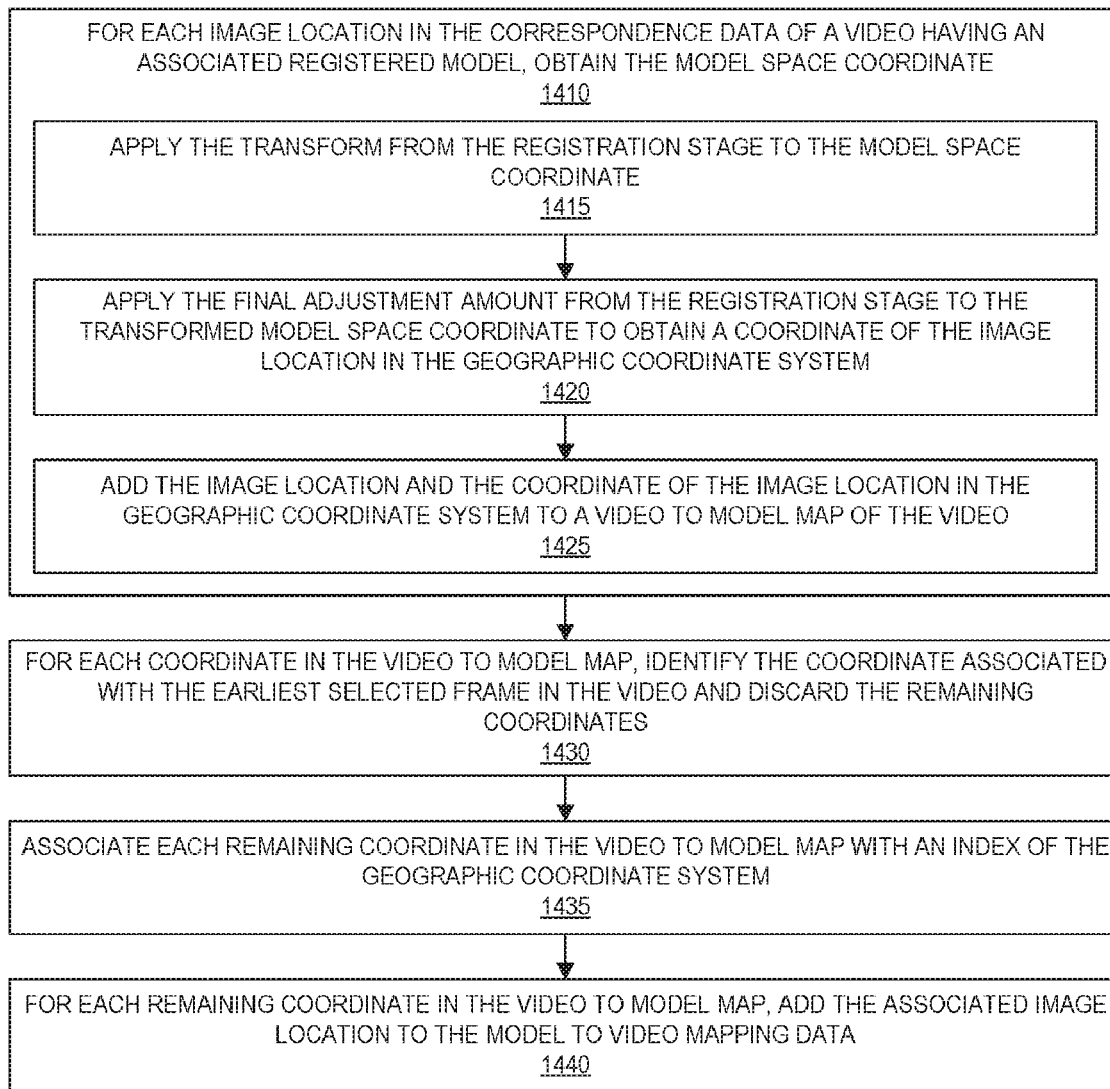
FIG. 14 illustrates a flow diagram of a process for video to model mapping, according to some embodiments.

FIG. 14 illustrates a flow diagram of a process for video to model mapping, according to some embodiments. The flow illustrated in FIG. 14 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the flow is performed by the video-model mapping stage 245 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1410, a processing device obtains the model space coordinates for each image location in the correspondence data associated with a video having an associated registered model. As described above, the reconstruction stage 225 generates correspondence data during the reconstruction process that links locations of the source imagery to the resulting model space. In the case of video, the image location may correspond to a pixel or group of pixels and the associated frame in the video. For still images, the image location may correspond to a pixel or group of pixels. The video-model mapping stage 245 obtains the correspondence data for each image location and, for each location, performs operations 1415 to 1425, to translate the obtained image locations to the geographic coordinate system.

At block 1415, the processing device applies the transform calculated during the registration process to transform the model space coordinate into the geographic coordinate system. At block 1420, the processing device applies the final adjustment amount calculated during the registration process for the registered model to the transformed model space coordinate to obtain a coordinate corresponding to the image location in the geographic coordinate system. At block 1425, the processing device adds the image location and the associated coordinate to a video-to-model map for the video.

At block 1430, the processing device identifies, for the set of coordinates in the video-to-model map, the coordinate associated with the earliest selected frame in the video and discards the remaining coordinates. Such an operation may be performed to eliminate redundant data (e.g., if the correspondence data includes image locations spanning a 15-second clip of the image location, the first image location can be used to start playback of the entire clip).

At block 1435, the processing device associates each remaining coordinate in the video-to-model map with a region of the geographic coordinate system (e.g., a video mapping tile 1320). Again, the region may correspond to a cell identifier in embodiments using the S2 geometry library, and the association may be performed by a translation from the geographic coordinate system (e.g., ECEF) to S2.

Figure 15:
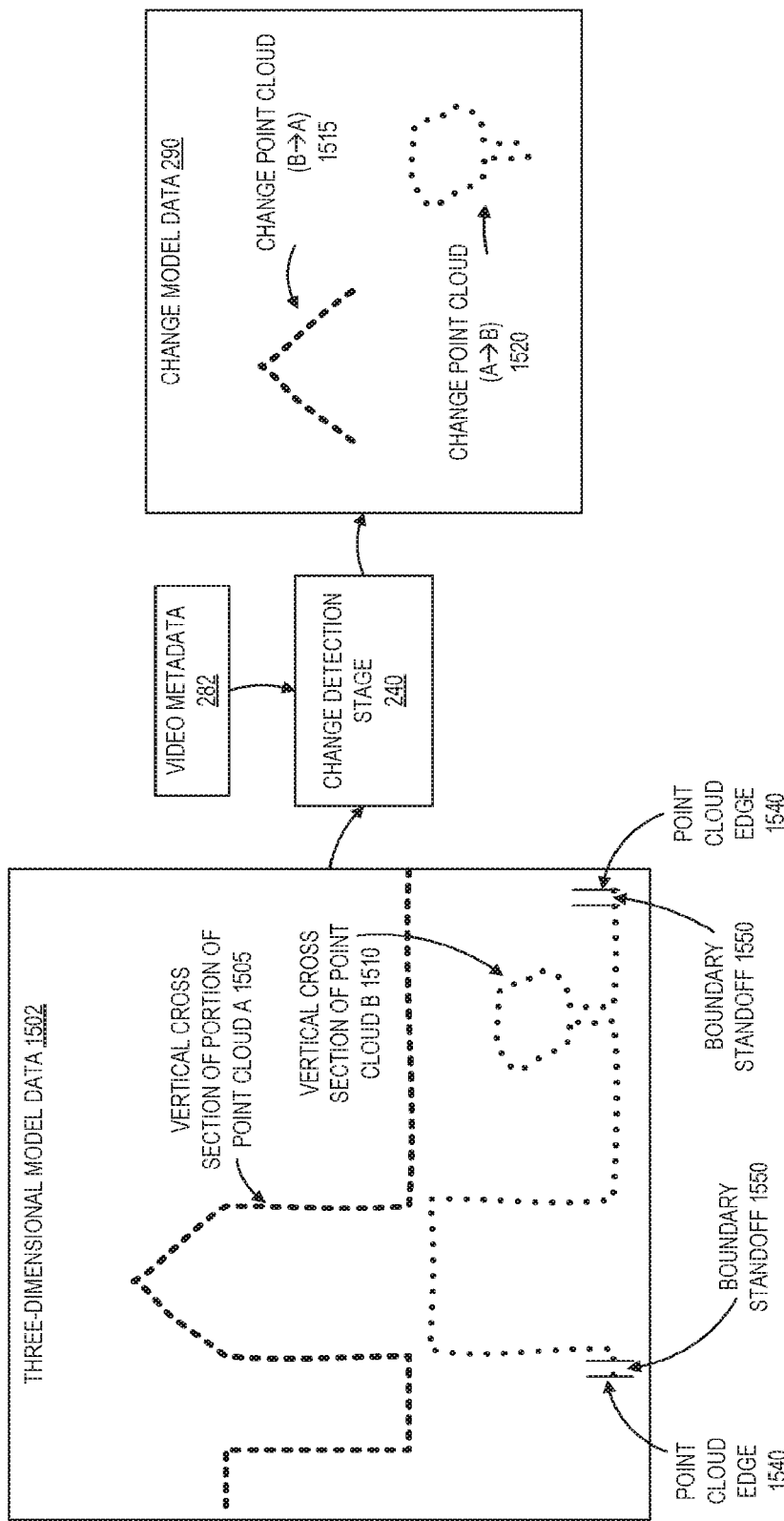
FIG. 15 illustrates a change detection stage of a mapping system and associated I/O, according to some embodiments.

At block 1440, the processing device indexes, for each remaining coordinate, the associated image location to a region in the model to video mapping data store 289. Using this index, Change Detection FIG. 15 illustrates a change detection stage of a mapping system and associated I/O, according to some embodiments. As shown, the change detection stage 240 takes as inputs three-dimensional models 1502, which may be registered point clouds or base layer models stored in the registered point clouds data store 286 or the base layer data store 291. The change detection stage 240 outputs change models to the change model data store 290. Change models are three-dimensional models that represent terrain features that may have been added or removed from one model to the next. For example, if a first video captures a building and a second, subsequent video captures empty ground where the first video captured the building, change models can be used to indicate the removal of the building (when displaying the model associated with the second video) or the addition of the building (when viewing the model data associated with the first video).

FIG. 15 illustrates two vertical cross-sections of the same plane of two registered models. In particular, cross-section 1505 is a cross-section of a portion of point cloud A (which extends beyond the area shown) and cross-section 1510 is a cross-section of point cloud B (which does not extend beyond the area shown). Cross-section 1505 includes a pitched roof on a structure relative to cross-section 1510. Cross-section 1510 includes a tree relative to cross-section 1505. The change detection stage 240 can generate change models (e.g., point clouds) 1515 and 1520. Because the inputs to the comparison—whether registered point clouds or base layer model data—are registered to the geographic coordinate system, the resulting change models are registered within the geographic coordinate system (and may be associated one or more indices of a region indexing system). In some embodiments, separate change models 1515 and 1520 are stored to indicate additions or removals in models (e.g., model A to model B and vice versa), as illustrated in FIG. 15. In other embodiments, change models may be combined where the points include an indication whether they are an addition or removal relative to the models used in the comparison.

In some embodiments, the change detection stage 240 applies a standoff distance 1550 to edges 1540 of point clouds used in comparisons to avoid model noise from introducing change artifacts without a terrain analog. In particular, when using nearest-neighbor based comparisons, edges of point clouds may have sparse regions of points, resulting in erroneous distance estimates between models.

Figure 16:
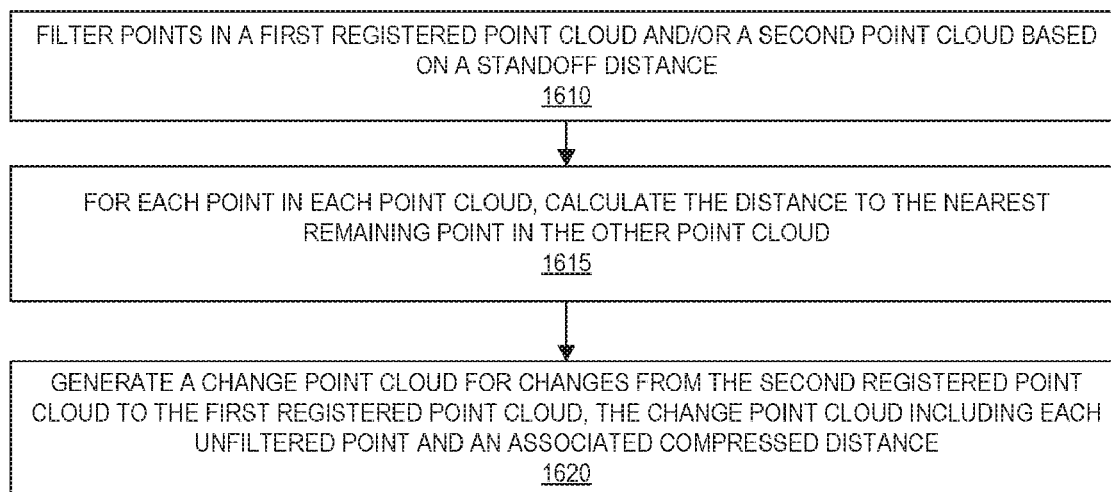
FIG. 16 illustrates a flow diagram of a process for change detection, according to some embodiments.

FIG. 16 illustrates a flow diagram of a process for change detection, according to some embodiments. The flow illustrated in FIG. 16 can be performed by processing logic that can include hardware (e.g., processing device, circuitry, dedicated logic, programmable logic, microcode, hardware of a device, integrated circuit, etc.), software (e.g., instructions run or executed on a processing device), or some combination thereof. In some embodiments, the flow is performed by the change detection stage 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1610, a processing device filters points in a first registered point cloud and/or a second point cloud based on a standoff distance. For example, the change detection stage 240 can evaluate models being compared to determine the intersection of the two models. Based on the intersection, the change detection stage 240 can apply a standoff distance such that the region of comparison is smaller than the region of intersection. With reference to FIG. 15, the comparison region would correspond to the points within the two models A and B between the demarcated standoff distances 1550.

At block 1615, the processing device calculates the distance from each remaining (unfiltered) point in each point cloud to the nearest point in the other point cloud. Distances from the first point cloud to the second point cloud are classified as changes from the first point cloud to the second point cloud, and vice versa. Depending on whether the first point cloud or the second point cloud is based on more recent imagery data, the changes may be classified as additions or removals. For example, if point cloud A is based on more recent imagery data than point cloud B, positive distances from points in point cloud A to points in point cloud B correspond to additions from A to B. Similarly, positive distances from points in point cloud B to points in point cloud A correspond to removals from B to A.

In some embodiments, the change detection stage 240 compresses the calculated distances to a range having a minimum and a maximum. Such compression may be used to improve the subsequent display of change models. For example, in some embodiments, change models are displayed to the client with points of the model having a color based on the calculated distances according to some color gradient. For example, using a typical violet-red spectrum of visible light, large distances may correspond to the color red, small distances to the color violet, and distances in between to the corresponding color within the spectrum. If the maximum change distance was significantly larger than the typical change distance, the maximum change distance would compress the remaining change distances to a relatively monochromatic portion of the gradient. For example, if one change was 100 meters while all of the other changes were less than 5 meters, the majority of the change model would be compressed into the lowest 5% of the selected color gradient. To avoid this scenario, the change detection stage 240 compresses large changes to the range maximum (e.g., 5 meters).

At block 1620, the processing device generates a change point cloud for changes from the second registered point cloud to the first registered point cloud, the change point cloud including each unfiltered point and an associated compressed distance. The change detection stage 240 may store the resulting change model in the change model data 290. The change models may be overlaid on their original model to highlight additions or removals between the two registered models. With reference to FIG. 15, the change point cloud 1515 may be overlaid on point cloud B to illustrate the addition of the roof (assuming point cloud B is older than point cloud A). Similarly, the change point cloud 1520 may be overlaid on point cloud A to illustrate the removal of the tree (again assuming point cloud B is older than point cloud A).

In some embodiments, the change point cloud is added to an index based on an identification of the "from" video identifier to the "to" video identifier. Thus, the index would include two entries: one for the change model from point cloud A to B and the other for the change model from point cloud B to A. When viewing the map, a user can provide an indication of two videos for comparison, and the mapping system 100 can identify the change models from the first video to the second video and from the second video to the first video based on the index.

Client-Server Interactions

As described above, in addition to generating a three-dimensional geo-registered map 110, the mapping system 100 can generate change models that reflect differences between three-dimensional models and model-to-video mapping data to relate locations within the three-dimensional geo-registered map 110 to locations in source imagery (e.g., pixel locations in images or frames). Each of these types of data may be sent by the mapping system 100 to client computing device(s) 205.

In some embodiments, a user of a client computing device 205 can explore the three-dimensional geo-registered map 110. For example, the client computing device 205, in communication with the mapping system 100 (e.g., via the frontend 215) requests a portion of the three-dimensional geo-registered map 110. The mapping system 100 sends model data (e.g., ECEF coordinates) associated with the portion of the map 110 to the client computing device 205, and the client computing device 205 displays the model. The user can move the displayed model to a new location, causing the client computing device 205 to request a different portion of the map 110, the mapping system 100 to send additional model data associated with the new portion of the map 110 to the client electronic device, and the client computing device 205 to display the new portion of the model.

In some embodiments, the user of the client computing device 205 can view source imagery (e.g., video or image data) associated with a portion of the map 110. For example, the client computing device 205, in communication with the mapping system 100 (e.g., via the frontend 215), sends an indication of a location within the geographic coordinate system to the mapping system 100. The mapping system 100 determines a region of the geographic coordinate system (e.g., a S2 cell or a video mapping tile 1320) associated with the location. The mapping system 100 then identifies the associated imagery with that region by looking up the region in the in the model to video mapping data store 289. The mapping system 100 then sends one or more identifiers of imagery sources (e.g., videos, images) to the client computing device 205, allowing the user to select an imagery source which the client electronic device relays to the mapping system 100. Based on the user's selection, the mapping system 100 sends a portion of the associated imagery to the client electronic device 205 for display. For example, the selection may correspond to a particular frame of a particular video identified by the model to video mapping data store 289, from which playback of the video may start at the client computing device 205.

In some embodiments, the user of the client computing device 205 can view change models (e.g., between separately captured video or image data) associated with a portion of the map 110. For example, the client computing device 205, in communication with the mapping system 100 (e.g., via the frontend 215), sends an indication of two models to the mapping system 100. The mapping system 100 locates a change model between the two models (whether showing additions or removals relative to the older model) from an index of change models. The mapping system 100 sends at least a portion of a located change model to the client electronic device to display superimposed on another three-dimensional model, such as the older or the newer of the two models indicated from the client electronic device, including coloring information for the change model. As a result, the client computing device 205 can display the change model in colors representing an amount of change of a given portion of the map 110.

Figure 17:
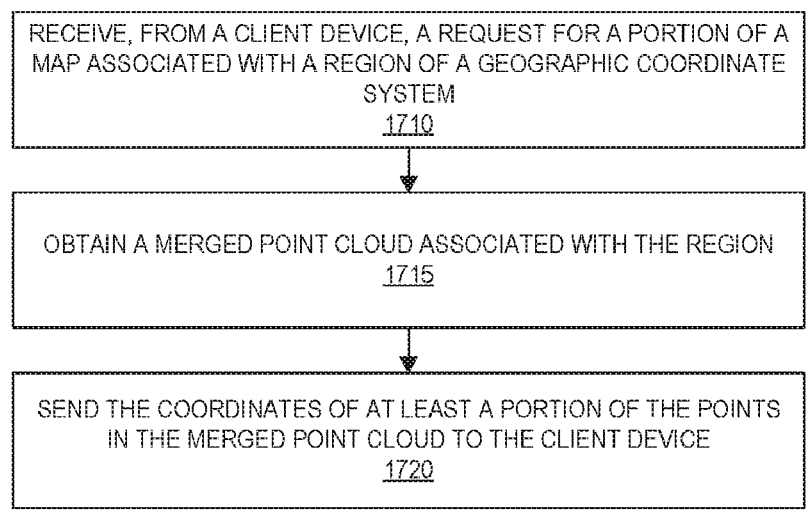
FIG. 17 illustrates a flow diagram of a process for sending three-dimensional map data to a client, according to some embodiments.

FIG. 17 illustrates a flow diagram of a process for sending three-dimensional map data to a client, according to some embodiments. The flow illustrated in FIG. 17 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the flow is performed by the frontend 215 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1710, a processing device receives, from a client device, a request for a portion of a map associated with a region of a geographic coordinate system. For example, the frontend 215 receives a request from a client computing device 205. The request may identify a portion of the map 110 in relative or absolute coordinates, such as in relation to an initial portion of a map 110 displayed by the client device or of a particular geographic coordinate system location. For example, the request may identify a set of ECEF coordinates, an S2 geometry cell, and/or the relative motion of the map 110 within a display area on a client computing device 205 as manipulated by a user.

At block 1715, the processing device obtains a merged point cloud associated with the region. For example, the frontend 215 identifies merged three-dimensional model data associated with the region of the map 110 in the merged model data store 288. The frontend 215 may identify the model data directly (e.g., corresponding to a geographic coordinate system coordinate or region indexing system identifier) or indirectly (based on a translation to a geographic system coordinate or to a region indexing system identifier) from the identity provided from the client computing device 205. Based on the identification of the region associated with the request, the frontend 215 obtains the three-dimensional model data from the merged model data store 288. Such data may be points in a point cloud, as described above.

At block 1720, the processing device sends the coordinates of at least a portion of the points in the merged point cloud to the client device. For example, the frontend 215 may send ECEF coordinates corresponding to a portion of the points associated with the requested region to the client computing device 205. The portion may correspond to a subset of the entire set of points corresponding to the region generating by downsampling the entire set of points to reduce the amount of data transmitted to the client computing device 205 or based on a zoom level or display resolution of the client computing device 205, for example.

Additional Information

Figure 18:
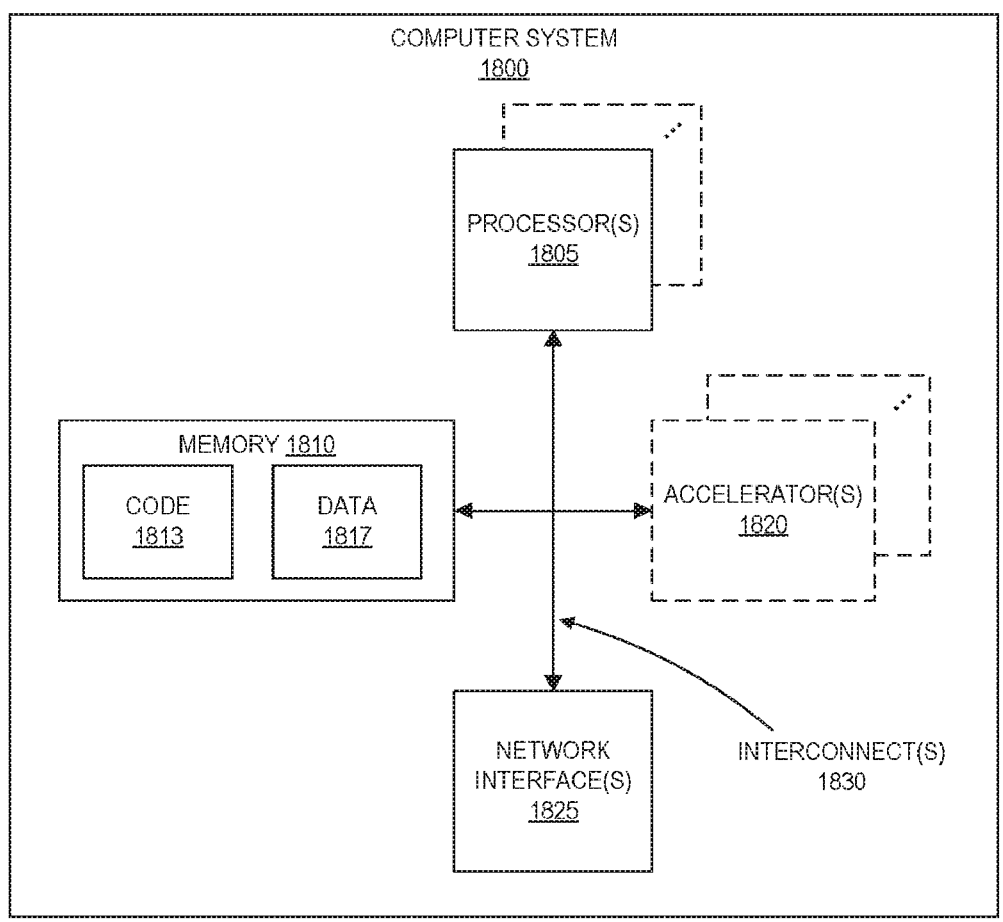
FIG. 18 illustrates a computer system to implement one or more aspects of the mapping system, according to some embodiments.

FIG. 18 illustrates a computer system 1800 to implement one or more aspects of the mapping system, according to some embodiments. As shown, the computer system 1800 includes one or more processors 1805, memory 1810, zero or more accelerators 1820, and one or more network interfaces 1825. These components are coupled via one or more interconnects 1830. The mapping system 100 may be implemented on one or more computer systems 1800, each of the components of the mapping system 100 may be implemented on one or more computer systems 1800, or some combination of the components of the mapping system 100 may be implemented on one or more computer systems 1800. In embodiments including a plurality of computer systems 1800, the computer systems 1800 are interconnected via one or more networks such as the internet or private networks such as intranets.

Processor(s) 1805 include electronic devices capable of executing code 1813 (e.g., instructions) stored in the memory 1810. Exemplary processors 1805 include those supporting the x86 instruction set architecture and the like.

Memory 1810 may include one or more volatile and/or non-volatile memory systems, such as random-access memory (RAM), static RAM (SRAM), synchronous dynamic RAM (SDRAM), nonvolatile-type memory such as Flash-, phase-change, or magnetic-type memory, or any other type of memory. The memory 1810 stores code 1813 and/or data 1817 for implementing one or more combinations of components of the mapping system 100, such as those illustrated in FIG. 2.

Accelerator(s) 1820 are electronic devices such as special-purpose processors (e.g., graphics processing units) that include multiple processing units to execute portions of code 1813 in parallel or with improved performance relative to the processor 1805.

Network interface(s) 1825 allow the mapping system 100 or portions of the mapping system 100 to communicate with other devices, such as a client computing device 205 or other portions of the mapping system 100, via a network. For example, the network interface(s) 1825 may communicate with the client computing device 205 or another computer system 1800 implementing another portion of the mapping system 100 via wireless or wired networks, including those supporting Ethernet-based communication.

Interconnect 1830 facilitates communication between components of the computer system 1800. Exemplary interconnects include the Peripheral Component Interconnect (PCI) bus, Infiniband, Intel QuickPath Interconnect, Universal Serial Bus, and the like. In some embodiments, the interconnect 1830 may include independent communications domains (e.g., connected by a bridge) to allow some components of the computer system 1800 to communicate independent of communications of other components of the computer system 1800.

While the invention has been described in terms of several embodiments, those skilled in the art will recognize that the invention is not limited to the embodiments described, can be practiced with modification and alteration within the spirit and scope of the appended claims. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining a plurality of images;
    generating a three-dimensional (3D) model from the plurality of images, the 3D model including separately tagged one or more estimated view locations to distinguish the one or more estimated view locations from model points of the 3D model;
    registering the 3D model to a geographic coordinate system as a first registered 3D model using the one or more estimated view locations; and
    merging the first registered 3D model with a second registered 3D model to generate a merged 3D model, wherein the merging the first registered 3D model includes:
        merging overlapping portions of the first registered 3D model with overlapping portions of the second registered 3D model; and
        stitching together non-overlapping portions of the first registered 3D model with non-overlapping portions of the second registered 3D model.

2. The computer-implemented method of claim 1, wherein the registering the 3D model to a geographic coordinate system as a first registered 3D model comprises:
    applying a transform to the 3D model to transform the 3D model from a first coordinate system to the geographic coordinate system, wherein the transform is based in part on global positioning system coordinates associated with the plurality of images and the one or more estimated view locations in the 3D model;
    downsampling model points in the transformed 3D model to generate a downsampled 3D model;
    determining a first adjustment to model points in the transformed 3D model based on the downsampled 3D model and a reference 3D model; and
    applying the first adjustment to the transformed 3D model to generate the first registered 3D model.

3. The computer-implemented method of claim 1, wherein the registering the 3D model to a geographic coordinate system as a first registered 3D model further comprises:
    applying a transform to the 3D model to transform the 3D model from a first coordinate system to the geographic coordinate system, wherein the transform is based in part on global positioning system coordinates associated with the plurality of images and the one or more estimated view locations in the 3D model;
    downsampling model points in the transformed 3D model to generate a downsampled 3D model;
    determining a first adjustment to model points of the transformed 3D model based on the downsampled 3D model and a reference 3D model;
    determining a second adjustment to model points of the transformed 3D model based on the first adjustment and the reference 3D model; and
    applying the second adjustment to the transformed 3D model to generate the first registered 3D model.

4. The computer-implemented method of claim 1, wherein the merging the first registered 3D model with a second registered 3D model to generate a merged 3D model comprises:
    identifying the registered second 3D model based on an overlap portion with the first registered 3D model in the geographic coordinate system; and
    generating a portion of the merged 3D model based on at least one point in the first registered 3D model and one point in the second registered 3D model.

5. The computer-implemented method of claim 1, further comprising:
    receiving, from a client device, a request including a value corresponding to a location within the geographic coordinate system that includes at least a portion of the merged 3D model; and
    sending, to the client device, a message identifying at least a subset of model points in the portion of the merged 3D model, wherein each model point in the subset has a three-dimensional coordinate.

6. The computer-implemented method of claim 1, further comprising:

obtaining an image location of an image of the plurality of images and a spatial location within the 3D model corresponding to the image location;

registering the spatial location to the geographic coordinate system; and associating the registered spatial location with an identifier of the image.

7. The computer-implemented method of claim 6, further comprising:

receiving, from a client device, a message indicative of a position of a representation of at least a portion of the merged 3D model on a graphical display of the client device, the position corresponding to the registered spatial location;

obtaining the identifier of the image associated with the registered spatial location; and sending the identifier of the image to the client device.

8. A system comprising:

a processing device; and a memory coupled to the processing device, the memory storing instructions which, when executed by the processing device, cause the processing device to:

obtain a plurality of images;

generate a three-dimensional (3D) model from the plurality of images, the 3D model including separately tagged one or more estimated view locations to distinguish the one or more estimated view locations from model points of the 3D model;

register the 3D model to a geographic coordinate system as a first registered 3D model using the one or more estimated view locations; and merge the first registered 3D model with a second registered 3D model to generate a merged 3D model to generate a merged 3D model, by at least:

merging overlapping portions of the first registered 3D model with overlapping portions of the second registered 3D model; and stitching together non-overlapping portions of the first registered 3D model with non-overlapping portions of the second registered 3D model.

9. The system of claim 8, wherein, to register the 3D model to the geographic coordinate system as the first registered 3D model, the instructions cause the processing device to:

apply a transform to the 3D model to transform the 3D model from a first coordinate system to the geographic coordinate system, wherein the transform is based in part on global positioning system coordinates associated with the plurality of images and the one or more estimated view locations in the 3D model;

downsample model points in the transformed 3D model to generate a downsampled 3D model;

determine a first adjustment to model points in the transformed 3D model based on the downsampled 3D model and a reference 3D model; and apply the first adjustment to the transformed 3D model to generate the first registered 3D model.

10. The system of claim 8, wherein, to register the 3D model to the geographic coordinate system as the first registered 3D model, the instructions cause the processing device to:

apply a transform to the 3D model to transform the 3D model from a first coordinate system to the geographic coordinate system, wherein the transform is based in part on global positioning system coordinates associated with the plurality of images and the one or more estimated view locations in the 3D model;

downsample model points in the transformed 3D model to generate a downsampled 3D model;

determine a first adjustment to model points in the transformed 3D model based on the downsampled 3D model and a reference 3D model;

determine a second adjustment to model points of the transformed 3D model based on the first adjustment and the reference 3D model; and apply the second adjustment to the transformed 3D model to generate the first registered 3D model.

11. The system of claim 8, wherein, to merge the first registered 3D model with the second registered 3D model to generate the merged 3D model, the instructions cause the processing device to:

identify the registered second 3D model based on an overlap portion with the first registered 3D model in the geographic coordinate system; and generate a portion of the merged 3D model based on at least one point in the first registered 3D model and one point in the second registered 3D model.

12. The system of claim 8, wherein the instructions cause the processing device to:

receive, from a client device, a request including a value corresponding to a location within the geographic coordinate system that includes at least a portion of the merged 3D model;

send, to the client device, a message identifying at least a subset of model points in the portion of the merged 3D model, wherein each model point in the subset has a three-dimensional coordinate.

13. The system of claim 8, wherein the instructions cause the processing device to:

obtain an image location of an image of the plurality of images and a spatial location within the 3D model corresponding to the image location;

register the spatial location to the geographic coordinate system; and associate the registered spatial location with an identifier of the image.

14. The system of claim 13, wherein the instructions cause the processing device to:

receive, from a client device, a message indicative of a position of a representation of at least a portion of the merged 3D model on a graphical display of the client device, the position corresponding to the registered spatial location;

obtain the identifier of the image associated with the registered spatial location; and send the identifier of the image to the client device.

15. A non-transitory computer-readable storage medium comprising instructions that, when executed by a computer system, cause one or more processing devices to:

obtain a plurality of images;

generate a three-dimensional (3D) model from the plurality of images, the 3D model including separately tagged one or more estimated view locations to distinguish the one or more estimated view locations from model points of the 3D model;

register the 3D model to a geographic coordinate system as a first registered 3D model using the one or more estimated view locations; and merge the first registered 3D model with a second registered 3D model to generate a merged 3D model, by at least:
  merging one or more overlapping portions of the first registered 3D model with one or more overlapping portions of the second registered 3D model; and
  stitching together one or more non-overlapping portions of the first registered 3D model with one or more non-overlapping portions of the second registered 3D model.

16. The non-transitory computer-readable storage medium of claim 15 wherein, to register the 3D model to the geographic coordinate system as the first registered 3D model, the instructions cause the one or more processing devices to:
  apply a transform to the 3D model to transform the 3D model from a first coordinate system to the geographic coordinate system, wherein the transform is based in part on global positioning system coordinates associated with the plurality of images and the one or more estimated view locations in the 3D model;
  downsample model points in the transformed 3D model to generate a downsampled 3D model;
  determine a first adjustment to model points in the transformed 3D model based on the downsampled 3D model and a reference 3D model; and
  apply the first adjustment to the transformed 3D model to generate the first registered 3D model.

17. The non-transitory computer-readable storage medium of claim 15 wherein, to register the 3D model to the geographic coordinate system as the first registered 3D model, the instructions cause the one or more processing devices to:
  apply a transform to the 3D model to transform the 3D model from a first coordinate system to the geographic coordinate system, wherein the transform is based in part on global positioning system coordinates associated with the plurality of images and the one or more estimated view locations in the 3D model;
  downsample model points in the transformed 3D model to generate a downsampled 3D model;
  determine a first adjustment to model points in the transformed 3D model based on the downsampled 3D model and a reference 3D model;
  determine a second adjustment to model points of the transformed 3D model based on the first adjustment and the reference 3D model; and
  apply the second adjustment to the transformed 3D model to generate the first registered 3D model.

18. The non-transitory computer-readable storage medium of claim 15 wherein, to merge the first registered 3D model with the second registered 3D model to generate the merged 3D model, the instructions cause the one or more processing devices to:
  identify the registered second 3D model based on an overlap portion with the first registered 3D model in the geographic coordinate system; and
  generate a portion of the merged 3D model based on at least one point in the first registered 3D model and one point in the second registered 3D model.

19. The non-transitory computer-readable storage medium of claim 15, wherein the instructions further cause the one or more processing devices to:
  receive, from a client device, a request including a value corresponding to a location within the geographic coordinate system that includes at least a portion of the merged 3D model; and
  send, to the client device, a message identifying at least a subset of model points in the portion of the merged 3D model, wherein each model point in the subset has a three-dimensional coordinate.

20. The non-transitory computer-readable storage medium of claim 15, wherein the instructions further cause the one or more processing devices to:
  obtain an image location of an image of the plurality of images and a spatial location within the 3D model corresponding to the image location;
  register the spatial location to the geographic coordinate system; and
  associate the registered spatial location with an identifier of the image.

21. The non-transitory computer-readable storage medium of claim 20, wherein the instructions further cause the one or more processing devices to:
  receive, from a client device, a message indicative of a position of a representation of at least a portion of the merged 3D model on a graphical display of the client device, the position corresponding to the registered spatial location;
  obtain the identifier of the image associated with the registered spatial location; and
  send the identifier of the image to the client device.

* * * * *